(12) United States Patent
Tsuchida et al.

(10) Patent No.: US 11,408,486 B2
(45) Date of Patent: Aug. 9, 2022

(54) PLANETARY GEAR DEVICE AND COMPOUND PLANETARY GEAR DEVICE

(71) Applicant: KUBOTA CORPORATION, Osaka (JP)

(72) Inventors: Tomonari Tsuchida, Osaka (JP); Ryoma Iwase, Osaka (JP); Tomoyuki Tanaka, Osaka (JP); Takahiro Matsuo, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/340,751

(22) Filed: Jun. 7, 2021

(65) Prior Publication Data

US 2021/0404534 A1  Dec. 30, 2021

(30) Foreign Application Priority Data

Jun. 26, 2020  (JP) .............................. JP2020-110863
Jun. 26, 2020  (JP) .............................. JP2020-110864
Jun. 26, 2020  (JP) .............................. JP2020-110865

(51) Int. Cl.
*F16H 1/46* (2006.01)
*F16H 1/28* (2006.01)
(Continued)

(52) U.S. Cl.
CPC ................. *F16H 1/46* (2013.01); *F16H 1/28* (2013.01); *F16H 57/043* (2013.01); *F16H 57/0486* (2013.01); *F16H 57/082* (2013.01)

(58) Field of Classification Search
CPC .............................. F16H 57/043; F16H 57/082
See application file for complete search history.

(56) References Cited

U.S. PATENT DOCUMENTS 4,077,282 A   3/1978  Kress
5,928,100 A   7/1999  Ohtake et al.
(Continued)

FOREIGN PATENT DOCUMENTS

CN    201802848 U    4/2011
DE    102017112334 A1    12/2018
(Continued)

OTHER PUBLICATIONS

European Search Report in counterpart European application No. EP 21178388.1, dated Nov. 24, 2021.
(Continued)

*Primary Examiner* — Derek D Knight
(74) *Attorney, Agent, or Firm* — Greenblum & Bernstein, P.L.C.

(57) ABSTRACT

A carrier includes a first carrier portion and a second carrier portion. The first carrier portion includes a gear housing space that houses a planetary gear, an opening that opens the gear housing space toward the second carrier portion and allows the planetary gear to fit into the gear housing space, and a first support hole that supports a first end portion of the planetary support shaft. The second carrier portion includes a cover portion that covers the opening, a second support hole that supports a second end portion of the planetary support shaft, and a joining portion that detachably joins the second carrier portion to the first carrier portion. The joining portion is joined to the first carrier portion by being tightened in a direction aligned with a direction of an axial core of a sun gear.

16 Claims, 11 Drawing Sheets

(51) Int. Cl.
  *F16H 57/04*    (2010.01)
  *F16H 57/08*    (2006.01)

(56) References Cited

U.S. PATENT DOCUMENTS

| | | | |
|---|---|---|---|
| 6,099,432 A * | 8/2000 | Shirokoshi | F16H 1/2863 |
| | | | 475/331 |
| 2018/0163834 A1 | 6/2018 | Boguski et al. | |
| 2019/0285142 A1* | 9/2019 | Kirchge ner | F16H 57/033 |

FOREIGN PATENT DOCUMENTS

| | | |
|---|---|---|
| EP | 3 715 673 A1 | 9/2020 |
| JP | 2018-17392 A | 2/2018 |
| JP | 2019-95058 | 6/2019 |

OTHER PUBLICATIONS

European Search Report in counterpart EP application No. 21178388.1, dated Mar. 30, 2022.

* cited by examiner

PLANETARY GEAR DEVICE AND COMPOUND PLANETARY GEAR DEVICE

BACKGROUND OF THE INVENTION

1. Field of the Invention

The present invention relates to a planetary gear device and a compound planetary gear device.

2. Description of the Related Art

Background Art 1

A planetary gear device includes a sun gear, planetary gears that mesh with the sun gear, an internal gear that meshes with the planetary gears, and a carrier that rotatably supports the planetary gears and rotates together with the planetary gears revolving around the sun gear with the axial core of the sun gear as its center of rotation. A known planetary gear device of this type includes, on the carrier, planetary support shafts that support planetary gears, a first carrier portion that supports a first end portion of the planetary support shafts located on the planetary support shaft first end side of the planetary gears, and a second carrier portion that supports a second end portion of the planetary support shafts located on the planetary support shaft second end side of the planetary support shafts.

An example of this type of planetary gear device is the planetary gear assembly illustrated in FIGS. 11, 12, and 13 of Patent Document 1 (JP 2018-17392). In the planetary gear assembly described in Patent Document 1, a first support hole that supports a first end portion of a carrier pin, i.e., a planetary support shaft, is provided on a first end wall of a carrier body, a second support hole that supports a second end portion of the carrier pin is provided on a second end wall of the carrier body, a first carrier portion is constituted by the second end wall of the carrier body, and a second carrier portion is constituted by the first end wall of the carrier body. In the planetary gear assembly of Patent Document 1, the first end wall and the second end wall are joined via a joining portion, and the joining portion is provided with an access opening via which the planetary gear can be inserted inside the carrier body.

Background Art 2

The planetary gear assembly described in Patent Document 2 (JP 2019-95058) is an example of a planetary gear device and includes a sun gear, planetary gears that mesh with the sun gear, an internal gear that meshes with the planetary gears, and a carrier that rotatably supports the planetary gears and rotates together with the planetary gears revolving around the sun gear with the axial core of the sun gear as its center of rotation.

Background Art 3

A known compound planetary gear device includes a first planetary gear device unit including first sun gear, a first planetary gear that meshes with the first sun gear, and a first internal gear that meshes with the first planetary gear and a second planetary gear device unit including a second sun gear with its axial core coaxially aligned with the axial core of the first sun gear, a second planetary gear that meshes with the second sun gear, and a second internal gear that meshes with the second planetary gear.

The technology described in Patent Document 2 is an example of this type of a compound planetary gear device.

In Patent Document 2, the compound planetary gear device described is a compound planetary transmission unit. The compound planetary transmission unit is provided with two planetary gear assemblies arranged in two rows, with the planetary gear assembly of each row being provided with a sun gear, a planetary gear, and an internal gear.

SUMMARY OF THE INVENTION

Technical Problem

Problem 1

The problem with Background Art 1 is as follows.

In a case where this known technology is employed, the planetary gear is inserted from the access opening into the space between the first end wall and the second end wall and held in a state where a carrier pin insertion hole of the planetary gear is disposed coinciding with the first support hole and the second support hole, and then the carrier pin is inserted in the second support hole from the lateral outer side of the carrier body and into a pin hole and a first pin hole. With this method of attaching the planetary gear to the carrier, assembly takes time and effort.

The present invention provides a planetary gear device in which a carrier can support planetary support shafts on both lateral sides of planetary gears and the planetary gears can be easily attached to the carrier.

Problem 2

The problem with Background Art 2 is as follows.

In a case where the planetary gear device is provided in a travel transmission device of a tractor, for example, power transmission is performed at high-speed rotations. Thus, there is a demand for a planetary gear device in which the sun gear and the planetary gear can rotate at high speeds.

The present invention provides a planetary gear device capable of rotating a sun gear and a planetary gear at high speeds.

Problem 3

The problem with Background Art 3 is as follows.

The compound planetary gear device described above has a configuration in which the second planetary gear revolves around the second sun gear interlocking with the first planetary gear revolving around the first sun gear. Even in regard to a compound planetary gear device in which the first planetary gear and the second planetary gear revolve in an interlocking manner, there is a demand for a compound planetary gear device in which the first planetary gear and the second planetary gear are firmly supported by the carrier removing any looseness and the first planetary gear and the second planetary gear are easily attached to the carrier.

The present invention provides a compound planetary gear device in which a first planetary gear and a second planetary gear revolve in an interlocking manner, the first planetary gear and the second planetary gear are firmly supported by the carrier, the first planetary gear and the second planetary gear are easily attached to the carrier.

Solution to Problem

A solution to solving Problem 1 is as follows.

A planetary gear device according to the present invention includes: a sun gear; a planetary gear that meshes with the sun gear; an internal gear that meshes with the planetary gear; and a carrier that rotatably supports the planetary gear and rotates together with the planetary gear revolving around the sun gear with an axial core of the sun gear as its center of rotation, wherein the carrier includes a planetary support shaft that supports the planetary gear, a first carrier portion that supports a first end portion of the planetary support shaft located on a planetary support shaft first end side of the planetary gear, and a second carrier portion that supports a second end portion of the planetary support shaft located on a planetary support shaft second end side of the planetary gear; the first carrier portion includes a gear housing space that houses the planetary gear, an opening that opens the gear housing space toward the second carrier portion and allows the planetary gear to fit into the gear housing space, and a first support hole that supports the first end portion, the first support hole being provided opening toward the gear housing space on an opposite side to a side where the opening is located with respect to the gear housing space; the second carrier portion includes a cover portion that covers the opening, a second support hole that supports the second end portion, the second support hole being provided opening toward the gear housing space in the cover portion, and a joining portion that joins the second carrier portion to the first carrier portion; and the joining portion is configured such that the second carrier portion is detachably joined to the first carrier portion and the second carrier portion is joined to the first carrier portion by tightening in a direction aligned with a direction of the axial core of the sun gear.

According to this configuration, without separately inserting the planetary gear and the planetary support shaft into the gear housing space, the planetary gear can be inserted from the opening into the gear housing space while attached to the planetary support shaft. This allows the planetary gear and the planetary support shaft to be inserted in the gear housing space all at once. Even when the planetary gear and the planetary support shaft are inserted into the gear housing space all at once, the first end portion of the planetary support shaft fits into the first support hole, the first end portion of the planetary support shaft is supported by the first carrier portion, and the planetary gear is supported by the planetary support shaft while located in the gear housing space. In this state, when the joining portion is tightened to the first carrier portion, the second end portion of the planetary support shaft is fit into the second support hole, the second end portion of the planetary support shaft is supported by the second carrier portion, and the opening of the gear housing space is closed by the cover portion.

Also, the second carrier portion is joined to the first carrier portion, and the first end portion and the second end portion of the planetary support shaft is supported by the carrier. Thus, the planetary support shaft can be supported by the carrier on both lateral sides of the planetary gear. Because the planetary gear and the planetary support shaft can be inserted into the gear housing space all at once and the second end portion is fitted into the second support hole by the tightening and joining of the second carrier portion to the first carrier portion, a state can be obtained in which the planetary support shaft is supported by the carrier on both lateral sides of the planetary gear and the planetary gear is firmly supported by the carrier. Also, the planetary gear can be easily attached to the carrier.

According to the present invention, preferably the planetary gear is provided at a plurality of sections around the sun gear; the first carrier portion is made by casting; and an outer circumferential portion of the first carrier portion is formed by turning.

The mass of the first carrier portion around the sun gear axial can be made uniform via turning of the outer circumferential portion of the first carrier portion. Thus, the first carrier portion can be made rigid via casting of the first carrier portion, allowing the plurality of planetary gears to be firmly supported in the first carrier portion and the carrier to rotate smoothly without rotary vibration.

The present invention preferably includes a second sun gear with an axial core coaxially located with the axial core of the sun gear; a second planetary gear that meshes with the second sun gear; a second internal gear that meshes with the second planetary gear; a transmission gear that meshes with the planetary gear and transmits rotation of the planetary gear to the second planetary gear, wherein the carrier includes a second planetary support shaft that supports the second planetary gear; the first carrier portion includes a second gear housing space that houses the second planetary gear, a second opening that opens the second gear housing space toward the second carrier portion and allows the second planetary gear to fit into the second gear housing space, and a second support shaft first support hole that supports a second support shaft first end portion of the second planetary support shaft located on a second planetary support shaft first end side of the second planetary gear, the second support shaft first support hole being provided opening toward the second gear housing space on an opposite side to a side where the second opening is located with respect to the second gear housing space; and the second carrier portion includes a second cover portion that covers the second opening, and a second support shaft second support hole that supports a second support shaft second end portion of the second planetary support shaft located on a second planetary support shaft second end side of the second planetary gear, the second support shaft second support hole being provided opening toward the second gear housing space in the second cover portion.

According to this configuration, without separately inserting the second planetary gear and the second planetary support shaft into the second gear housing space, the second planetary gear can be inserted from the second opening into the second gear housing space while attached to the second planetary support shaft. This allows the second planetary gear and the second planetary support shaft to be inserted in the second gear housing space all at once. Even when the second planetary gear and the second planetary support shaft are inserted into the second gear housing space all at once, the second support shaft first end portion of the second planetary support shaft fits into the second support shaft first support hole, the second support shaft first end portion of the second planetary support shaft is supported by the first carrier portion, and the second planetary gear is supported by the second planetary support shaft while located in the second gear housing space. In this state, when the joining portion is tightened to the first carrier portion, the second support shaft second end portion of the second planetary support shaft is fit into the second support shaft second support hole, the second support shaft second end portion of the second planetary support shaft is supported by the second carrier portion, and the opening of the second gear housing space is closed by the second cover portion. Also, the second carrier portion is joined to the first carrier portion, and the second planetary support shaft is supported by the carrier at the second support shaft first end portion and the second support shaft second end portion. Thus, the second planetary support shaft can be supported by the carrier on both lateral sides. Because the second planetary gear and the second planetary support shaft can be inserted into the second gear housing space all at once and the second support shaft second end portion is fitted into the second support shaft second support hole by the tightening of the second carrier portion to the first carrier portion, with a compound planetary gear device, a state can be obtained in which the second planetary support shaft is also supported by the carrier on both lateral sides of the second planetary gear and the second planetary gear is firmly supported by the carrier. Also, the second planetary gear can be easily attached to the carrier.

In the present invention, preferably the transmission gear is configured to be housed in the second gear housing space while being supported by the second planetary support shaft; and the second support shaft second end portion is located on the second planetary support shaft on a second planetary support shaft second end side of the transmission gear.

According to this configuration, when the second planetary gear is inserted into the second gear housing space while attached to the second planetary support shaft, the transmission gear can also be inserted into the second gear housing space while attached to the second planetary support shaft. This allows the second planetary gear, the second planetary support shaft, and the transmission gear to be inserted in the second gear housing space all at once.

In the present invention, preferably the planetary gear is provided at a plurality of sections around the sun gear; the second planetary gear is provided numbering the same as the planetary gears; the first carrier portion is made by casting; and an outer circumferential portion of the first carrier portion is formed by turning.

According to this configuration, the mass of the first carrier portion around the sun gear axial can be made uniform via turning of the outer circumferential portion of the first carrier portion. Thus, the first carrier portion can be made rigid via casting of the first carrier portion, allowing the plurality of planetary gears and the plurality of second planetary gears to be firmly supported in the first carrier portion and the carrier to rotate smoothly without rotary vibration.

The present invention preferably includes a joining bolt including an axial core in a direction aligned with the direction of the axial core of the sun gear, the joining bolt being configured to tighten and join the joining portion to the first carrier portion by being installed in the joining portion and the first carrier portion and tightened.

According to this configuration, the second carrier portion is tightened to the first carrier portion by a tightening operation of the joining bolt, and with this tightening, the second end portion of the planetary support shaft is fit into the second support hole. Thus, a state in which the planetary support shaft is supported by the carrier on both lateral sides of the planetary gear can be easily obtained.

A solution to solving Problem 2 is as follows.

A planetary gear device according to the present invention includes: a sun gear; a planetary gear that meshes with the sun gear; an internal gear that meshes with the planetary gear; a carrier that rotatably supports the planetary gear and rotates together with the planetary gear revolving around the sun gear with an axial core of the sun gear as its center of rotation; a sun oil supply passage formed at an outer circumferential portion of a sun support shaft that rotatably supports the sun gear, the sun oil supply passage being configured to supply lubricating oil between the sun gear and the sun support shaft; a planetary oil supply passage formed at a planetary support shaft provided on the carrier in a state of rotatably supporting the planetary gear, the planetary oil supply passage being configured to supply lubricating oil between the planetary support shaft and the planetary gear; and an oil supply passage formed connecting the sun oil supply passage and the planetary oil supply passage and extending in a direction aligned with a radial direction of the carrier and aligned with the carrier, the oil supply passage being configured to take in lubricating oil from the sun oil supply passage and supply the lubricating oil thus taken in to the planetary oil supply passage via rotation of the carrier.

According to this configuration, lubricating oil is supplied between the sun support shaft and the sun gear via the sun oil supply passage, enabling the sun gear to rotate smoothly. When the carrier rotates, by the oil supply passage, lubricating oil is inserted from the sun oil passage, the taken in lubricating oil is supplied to the planetary oil supply passage, and lubricating oil supplied by the planetary oil supply passage is supplied between the planetary support shaft and the planetary gear. This allows the planetary gear to rotate smoothly, allowing the sun gear and the planetary gear to rotate at high-speeds. Also, the rotation of the carrier is used as the power source of the lubrication supply, removing the need to provide a separate power source.

In the present invention, preferably the oil supply passage includes an upstream oil passage portion that opens to the sun oil supply passage, a downstream oil passage portion that opens to the planetary oil supply passage, and a connection oil passage portion that connects the upstream oil passage portion and the downstream oil passage portion; in the oil supply passage, an oil passage width of the downstream oil passage portion in a direction aligned with the direction of the axial core of the sun gear is less than an oil passage width of the upstream oil passage portion in a direction aligned with the direction of the axial core; and the connection oil passage portion is formed with an oil passage width in a direction aligned with the direction of the axial core that tapers downstream on the downstream oil passage portion side.

According to this configuration, the connection oil passage portion functions to throttle the lubricating oil running from the upstream oil passage portion to the downstream oil passage portion, and the oil passage width of the downstream oil passage portion is less than the oil passage width of the upstream oil passage portion. Thus, even when there is a change in the amount of oil in the upstream oil passage portion, the amount of oil in the downstream oil passage portion can be stabilized, and the lubricating oil at a stabilized amount can be supplied between the planetary gear and the planetary support shaft.

The present invention preferably includes a second sun gear with an axial core coaxially located with the axial core of the sun gear; a second planetary gear that meshes with the second sun gear; a second internal gear that meshes with the second planetary gear; a transmission gear that meshes with the planetary gear and transmits rotation of the planetary gear to the second planetary gear, wherein the carrier includes a second planetary support shaft that supports the second planetary gear and is configured to rotate together with the second planetary gear revolving around the second sun gear with the axial core of the second sun gear as its center of rotation, the present invention preferably further includes a second planetary oil supply passage formed in the second planetary support shaft, the second planetary oil supply passage being configured to supply oil between the second planetary support shaft and the second planetary gear; and a second oil supply passage formed connecting the sun oil supply passage and the second planetary oil supply passage and extending in a direction aligned with a radial direction of the carrier and aligned with the carrier, the second oil supply passage being configured to take in lubricating oil from the sun oil supply passage and supply the lubricating oil thus taken in to the second planetary oil supply passage via rotation of the carrier.

According to this configuration, when the carrier rotates, by the second oil supply passage, lubricating oil is inserted from the sun oil passage, the taken in lubricating oil is supplied to the second planetary oil supply passage, and lubricating oil supplied by the second planetary oil supply passage is supplied between the second planetary support shaft and the second planetary gear. Thus, with a compound planetary gear device in which the rotation of the first planetary gear is transmitted to the second planetary gear via the transmission gear, the sun gear, the first planetary gear, and the second planetary gear can be rotated at high-speeds.

In the present invention, preferably the second oil supply passage includes a second upstream oil passage portion that opens to the sun oil supply passage, a second downstream oil passage portion that opens to the second planetary oil supply passage, and a second connection oil passage portion that connects the second upstream oil passage portion and the second downstream oil passage portion; in the second oil supply passage, an oil passage width of the second downstream oil passage portion in a direction aligned with the direction of the axial core of the sun gear is less than an oil passage width of the second upstream oil passage portion in a direction aligned with the direction of the axial core; and the second connection oil passage portion is formed with an oil passage width in a direction aligned with the direction of the axial core that tapers downstream on the second downstream oil passage portion side.

According to this configuration, the second connection oil passage portion functions to throttle the lubricating oil running from the second upstream oil passage portion to the second downstream oil passage portion, and the oil passage width of the second downstream oil passage portion is less than the oil passage width of the second upstream oil passage portion. Thus, even when there is a change in the amount of oil in the second upstream oil passage portion, the amount of oil in the second downstream oil passage portion can be stabilized, and the lubricating oil at a stabilized amount can be supplied between the second planetary gear and the second planetary support shaft.

In the present invention, preferably the transmission gear is supported by the second planetary support shaft.

According to this configuration, a composite planetary gear device with a simple configuration using the second planetary support shaft as a support shaft of the transmission gear can be obtained.

In the present invention, preferably the planetary gear is provided at a plurality of sections around the sun gear; the second planetary gear is provided numbering the same as the planetary gears; the planetary oil supply passage is formed in the planetary support shaft of each of the planetary gears; and the second planetary oil supply passage is formed in the second planetary support shaft of the second planetary gears numbering the same as the planetary gears.

According to this configuration, lubricating oil is supplied via the planetary oil supply passage between the planetary support shaft supporting each planetary gear of the plurality of planetary gears and the planetary gear, and lubricating oil is supplied via the second planetary oil supply passage between the second planetary support shaft supporting each second planetary gear of the plurality of second planetary gears and the second planetary gear. Thus, the plurality of planetary gears and the plurality of second planetary gears can be rotated at high-speeds at a low cost.

A solution to solving Problem 3 is as follows.

A compound planetary gear device according to the present invention includes: a first planetary gear device unit including a first sun gear, a first planetary gear that meshes with the first sun gear, and a first internal gear that meshes with the first planetary gear; a second planetary gear device unit including a second sun gear with an axial core coaxially located with an axial core of the first sun gear, a second planetary gear that meshes with the second sun gear, and a second internal gear that meshes with the second planetary gear; and a carrier that rotatably supports the first planetary gear and the second planetary gear and is configured to rotate together with the first planetary gear revolving around the first sun gear and together with the second planetary gear revolving around the second sun gear with the axial core of the first sun gear as its center of rotation, wherein the carrier includes a first planetary support shaft that supports the first planetary gear, a second planetary support shaft that supports the second planetary gear, a first carrier portion that supports a first end portion of the first planetary support shaft on a first planetary support shaft first end side of the first planetary gear and supports a second support shaft first end portion of the second planetary support shaft on a second planetary support shaft first end side of the second planetary gear, and a second carrier portion that supports a second end portion of the first planetary support shaft on a first planetary support shaft second end side of the first planetary gear and supports a second support shaft second end portion of the second planetary support shaft on a second planetary support shaft second end side of the second planetary gear; the second carrier portion is configured to be separable from the first carrier portion; and a reinforcing portion is integrally formed on one of the first carrier portion or the second carrier portion, the reinforcing portion being configured to be detachable from the other one of the first carrier portion and the second carrier portion and being configured to join the first carrier portion and the second carrier portion.

According to this configuration, the first planetary gear and the second planetary gear are both supported by the carrier, and the carrier is configured to rotate together with the first planetary gear revolving around the first sun gear and together with the second planetary gear revolving around the second sun gear with the axial core of the first sun gear as its center of rotation. Thus, the first planetary gear and the second planetary gear revolve in an interlocked manner.

The first planetary support shaft is supported by the carrier at the first end portion and the second end portion located on separate lateral sides of the portion supporting the first planetary gear, and the second planetary support shaft is supported by the carrier at the second support shaft first end portion and the second support shaft second end portion located on separate lateral sides of the portion supporting the second planetary gear.

In addition, the first carrier portion that supports the first end portion of the first planetary support shaft and supports the second support shaft first end portion of the second planetary support shaft and the second carrier portion that supports the second end portion of the first planetary support shaft and supports the second support shaft second end portion of the second planetary support shaft are joined, in a manner such that the first carrier portion and the second carrier portion do not misalign in the carrier circumferential direction, via a reinforcing portion integrally formed with one of the first carrier portion or the second carrier portion and firmly supported by one of the first carrier portion or the second carrier portion. Thus, no misalignment occurs between the first planetary support shaft and the carrier and between the second planetary support shaft and the carrier, and the first planetary gear and the second planetary gear are firmly supported without any looseness in the carrier.

The first planetary gear and the second planetary gear can be inserted into the carrier with the carrier divided into the first carrier portion and the second carrier portion. This makes inserting the first planetary gear and the second planetary gear into the carrier easy.

The present invention preferably further includes a transmission gear that meshes with the first planetary gear and transmits rotation of the first planetary gear to the second planetary gear, wherein the transmission gear is supported by the second planetary support shaft; the second support shaft first end portion of the second planetary support shaft is located on the second planetary support shaft on a second planetary support shaft first end side of the transmission gear; and the second support shaft second end portion of the second planetary support shaft is located on the second planetary support shaft on a second planetary support shaft second end side of the transmission gear.

According to this configuration, the second support shaft first end portion and the second support shaft second end portion located separated on the lateral sides of the portion that supports the second planetary gear and the transmission gear are supported by the carrier. Thus, with the transmission gear supported by the second planetary support shaft, the transmission gear and the second planetary gear are firmly supported in a manner where there is no looseness in the carrier, and the transmission gear and the second planetary gear are easily inserted into the carrier.

In the present invention, preferably the reinforcing portion is integrally formed with the first carrier portion and configured to be detachable from the second carrier portion.

According to this configuration, the second carrier portion can have a simple shape, making manufacturing the second carrier portion easy.

The present invention preferably includes a screw member including an axial core in a direction aligned with the direction of the axial core of the first sun gear, the screw member being configured to join the second carrier portion to the first carrier portion by being tightened in the second carrier portion and the reinforcing portion.

According to this configuration, the reinforcing portion is used as a mounting member for the screw member, allowing the second carrier portion to be firmly tightened and joined to the first carrier portion via a screw member with a short length.

In the present invention, preferably the first planetary gear is provided at a plurality of sections around the first sun gear; the second planetary gear is provided numbering the same as the first planetary gears; the first carrier portion is made by casting; and an outer circumferential portion of the first carrier portion is formed by turning.

According to this configuration, the mass of the first carrier portion around the sun gear axial can be made uniform via turning of the outer circumferential portion of the first carrier portion. Thus, the first carrier portion can be made rigid via casting of the first carrier portion, allowing the plurality of planetary gears and the plurality of second planetary gears to be firmly supported in the first carrier portion and the carrier to rotate smoothly without rotary vibration.

DETAILED DESCRIPTION OF PREFERRED EMBODIMENTS

An embodiment of the present invention will be described below with reference to the drawings.

Figure 1:
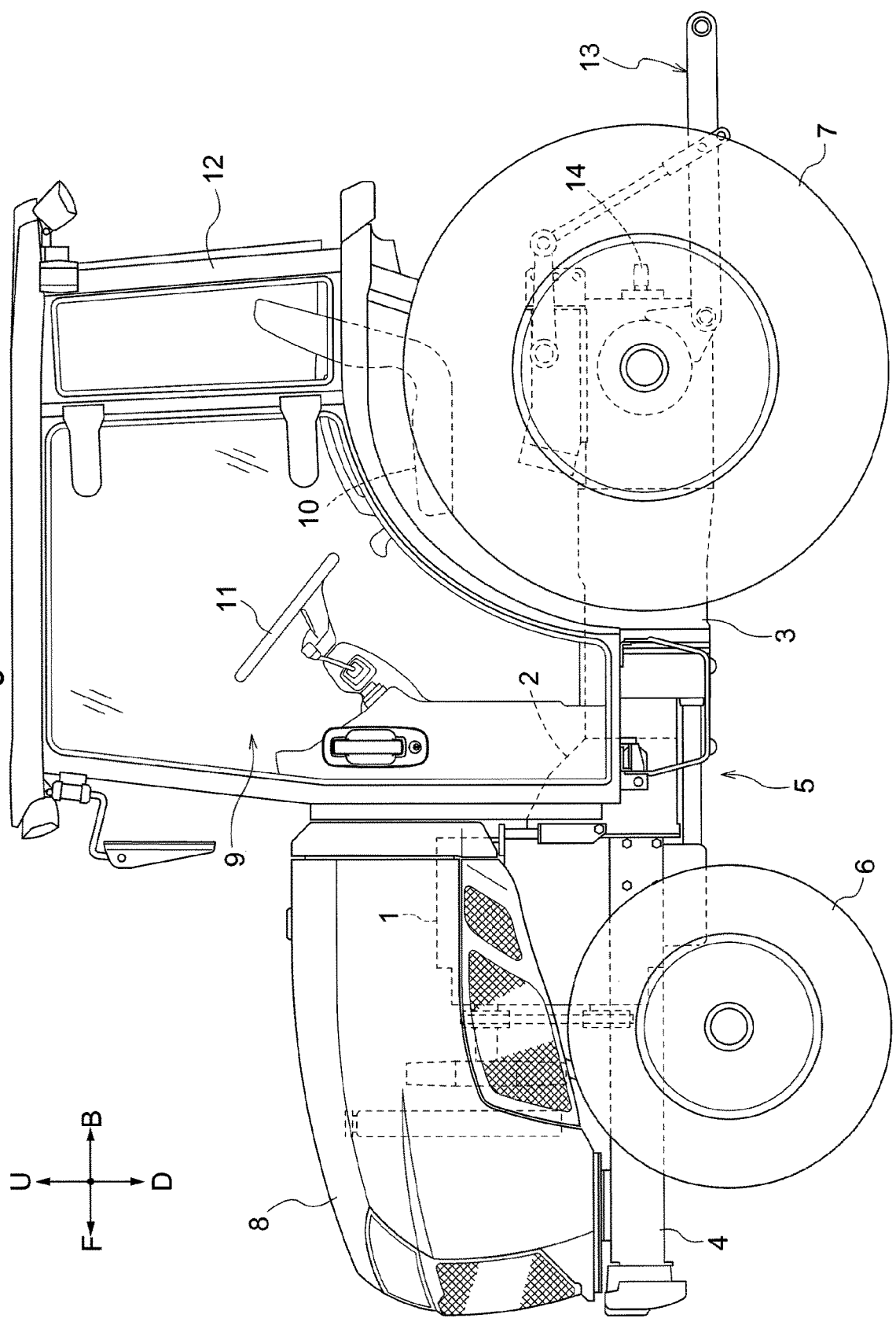
FIG. 1 is an overall left side view illustrating a tractor.

Note that herein, in relation to a traveling vehicle body, i.e., a tractor, as illustrated in FIG. 1, the direction of arrow F is defined as forward in relation to the vehicle body, the direction of arrow B is defined as rearward in relation to the vehicle body, the direction of arrow U is defined as upward in relation to the vehicle body, the direction of arrow D is defined as downward in relation to the vehicle body, the front side of the page is defined as left of the vehicle body, and the back side of the page is defined as the right of the vehicle body.

Overall Configuration of Tractor

The traveling vehicle body, i.e., the tractor, includes an engine 1, a clutch housing 2 provided on a rear portion of the engine 1, a transmission case 3 joined to the clutch housing 2, a vehicle body frame 5 constituted by a front frame 4 and the like, a left/right pair of front wheels 6 provided on the front portion of the vehicle body frame 5 in a manner allowing the front wheels 6 to be steered and driven, and a left/right pair of rear wheels 7 provided on the rear portion of the vehicle body frame 5 in a manner allowing the rear wheels 7 to be driven. A prime mover unit 8 including the engine 1 is formed at the front portion of the traveling vehicle body. A driving unit 9 is formed at the rear portion of the traveling vehicle body. The driving unit 9 is provided with a driver seat 10, a steering wheel 11 for steering the front wheels 6, and a cabin 12 that covers the riding space. The rear portion of the vehicle body frame 5 is provided with a link mechanism 13 for joining to a rotary tilling device (not illustrated) or similar work device in a manner allowing for the work device to be raised and lowered and a power take-off shaft 14 that takes off power from the engine 1 and transmits the taken power to the joined work device.

Travel Transmission Device

Figure 2:
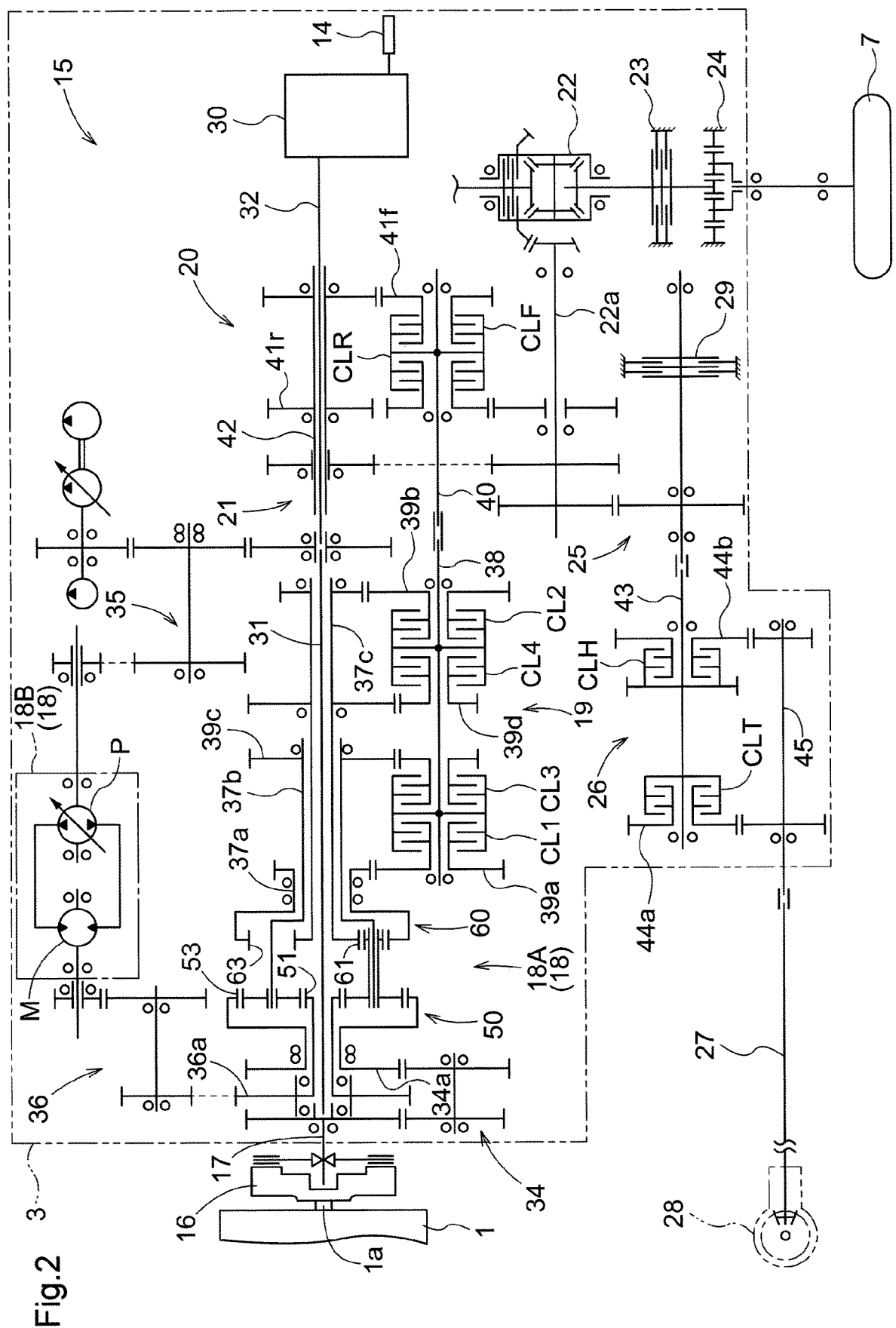
FIG. 2 is a line diagram illustrating a travel transmission device.

The power from the engine 1 is transmitted to the front wheels 6 and the rear wheels 7 via a travel transmission device 15 illustrated in FIG. 2.

As illustrated in FIG. 2, with the travel transmission device 15, the power of an output shaft 1a of the engine 1 is transmitted to an input shaft 17 of the transmission case 3 via a main clutch 16. The power of the input shaft 17 is input to a main transmission unit 18 including a planetary gear device 18A and the like, the output of the main transmission unit 18 is input to a stage-divided transmission unit 19, and the output of the stage-divided transmission unit 19 is input to a forward/reverse switching device 20. The output of the forward/reverse switching device 20 is transmitted to an input shaft 22a of a rear wheel differential mechanism 22 via a rear wheel gear interlocking mechanism 21. A power transmission system that transmits the output of the rear wheel differential mechanism 22 to the rear wheels 7 is provided with a steering brake 23 and a decelerating mechanism 24. The decelerating mechanism 24 is constituted by a planetary gear assembly. The power of the input shaft 22a of the rear wheel differential mechanism 22 is input to a front wheel transmission device 26 via a front wheel gear interlocking mechanism 25 and transmitted from the front wheel transmission device 26 to a front wheel differential mechanism 28 via a rotary shaft 27. The front wheel gear interlocking mechanism 25 is provided with a park brake 29.

In FIG. 2, 30 denotes a work transmission device. In the work transmission device 30, the power of the input shaft 17 is input via a rotary shaft 31 and a rear rotary shaft 32, and the input power changed in speed and transmitted to the power take-off shaft 14.

Main Transmission Unit

As illustrated in FIG. 2, the main transmission unit 18 is provided with the planetary gear device 18A and a continuously variable transmission device 18B. The planetary gear device 18A is provided with two planetary gear device units 50, 60 that are disposed side by side in the front-and-rear direction of the transmission case 3. The front planetary gear device unit 50, of the two planetary gear device units 50, 60, and the input shaft 17 are joined via a first gear interlocking mechanism 34. The continuously variable transmission device 18B is constituted by a hydrostatic continuously variable transmission device and is provided with a variable displacement type hydraulic pump P and a hydraulic motor M. The pump shaft of the continuously variable transmission device 18B and the input shaft 17 are interlockingly joined via a second gear interlocking mechanism 35 and the rotary shaft 31. The motor shaft of the continuously variable transmission device 18B and the front planetary gear device unit 50, of the two planetary gear device units 50, 60, are joined via a third gear interlocking mechanism 36.

In the main transmission unit 18, the power from the engine 1 is changed in speed by the continuously variable transmission device 18B, the speed-changed power and the power transmitted from the engine 1 via the third gear interlocking mechanism 36 are input to the planetary gear device 18A and combined by the two planetary gear device units 50, 60, and the combined power is output from a first output shaft 37a, a second output shaft 37b, and a third output shaft 37c that constitute a triple-shaft.

Stage-divided Transmission Unit

As illustrated in FIG. 2, the stage-divided transmission unit 19 is provided with four stage-divided clutches CL1 to CL4 where the output of the planetary gear device 18A is input and an output shaft 38 on which the four stage-divided clutches CL1 to CL4 are provided.

Figure 3:
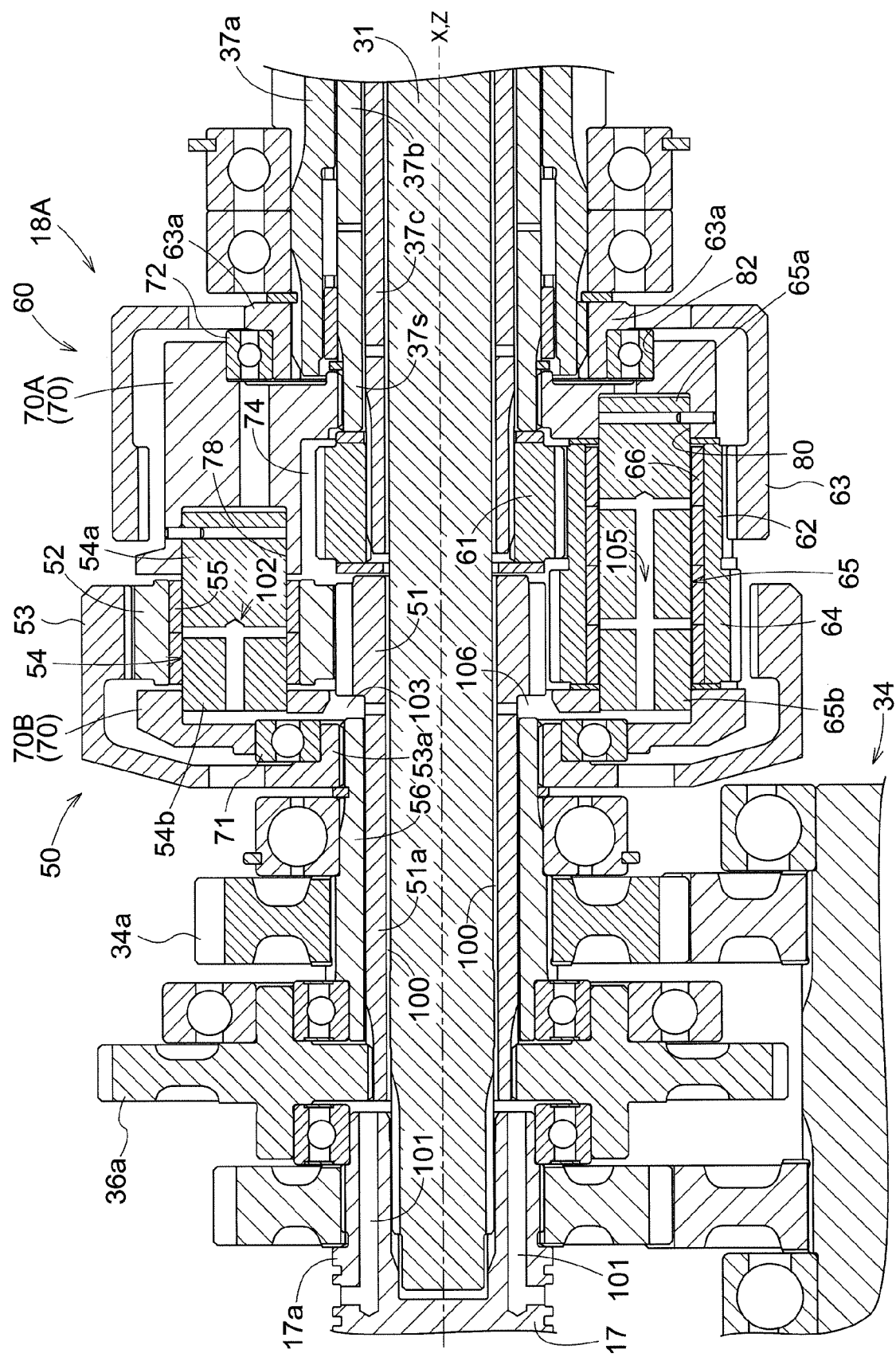
FIG. 3 is a cross-sectional view illustrating a planetary gear device.

As illustrated in FIG. 3, in the stage-divided transmission unit 19, by appropriately operating the continuously variable transmission device 18B and the four stage-divided clutches CL1 to CL4, the combined power from the planetary gear device 18A is divided into four stages of the speed range and output from the output shaft 38.

Figure 12:
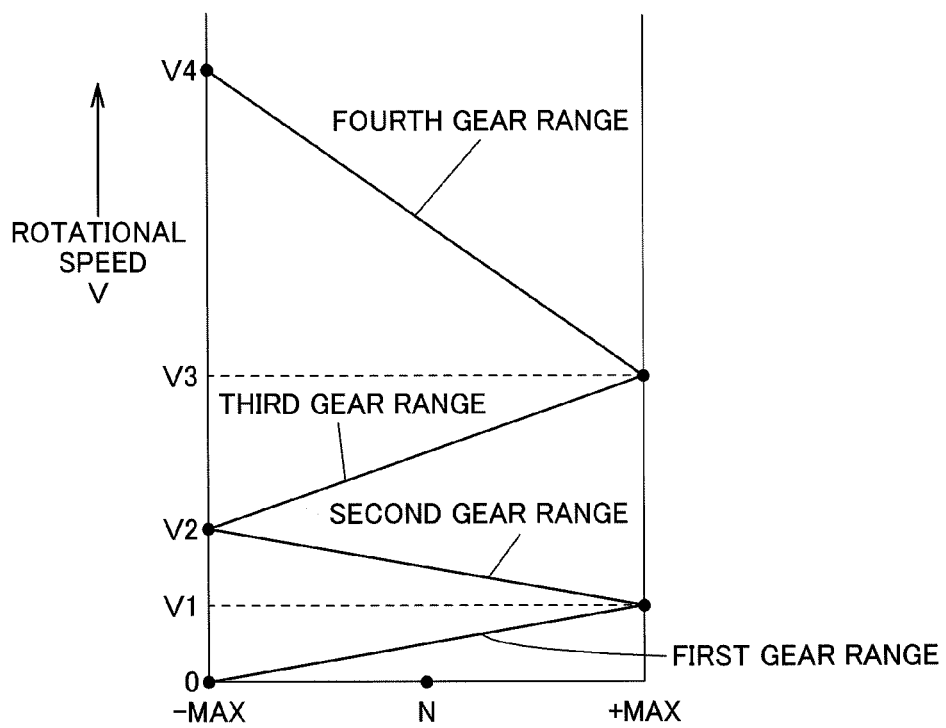
FIG. 12 is an explanatory diagram illustrating the relationship between speed-change state of a continuously variable transmission device, a speed range, and a rotational speed of an output shaft and a stage-divided transmission unit.

FIG. 12 is an explanatory diagram illustrating the relationship between speed-change state of the continuously variable transmission device 18B, the speed range, and a rotational speed V of the output shaft 38 and the stage-divided transmission unit 19. The vertical axis of FIG. 12 represents the rotational speed V of the output shaft 38. The horizontal axis of FIG. 12 represents the speed-change state of the continuously variable transmission device 18B, with N representing a neutral state and −MAX representing the fastest speed-change state in the reverse rotation direction. +MAX represents the fastest speed-change state in the forward rotation direction.

In a case where the first clutch CL1 of the four stage-divided clutches CL1 to CL4 is put in an engaged state and the continuously variable transmission device 18B is subject to a speed change operation, the power of a first output shaft 37a is changed in speed by a first gear interlocking mechanism 39a and the first clutch CL1 and output from the output shaft 38. As illustrated in FIG. 12, the rotational speed of the output shaft 38 corresponds to the rotational speed of the first gear range, and when the continuously variable transmission device 18B is changed in speed from −MAX toward +MAX, the rotational speed V of the output shaft 38 steplessly increases from zero speed 0 to a first gear range maximum speed V1.

In a case where the second clutch CL2 of the four stage-divided clutches CL1 to CL4 is put in an engaged state and the continuously variable transmission device 18B is subject to a speed change operation, the power of a third output shaft 37c is changed in speed by a second gear interlocking mechanism 39b and the second clutch CL2 and output from the output shaft 38. As illustrated in FIG. 12, the rotational speed of the output shaft 38 corresponds to the rotational speed of the second gear range, which is faster than the first gear range, and when the continuously variable transmission device 18B is changed in speed from +MAX toward −MAX, the rotational speed V of the output shaft 38 steplessly increases from the second gear range minimum speed V1 to the second gear range maximum speed V2.

In a case where the third clutch CL3 of the four stage-divided clutches CL1 to CL4 is put in an engaged state and the continuously variable transmission device 18B is subject to a speed change operation, the power of a second output shaft 37b is changed in speed by a third gear interlocking mechanism 39c and the third clutch CL3 and output from the output shaft 38. As illustrated in FIG. 12, the rotational speed of the output shaft 38 corresponds to the rotational speed of the third gear range, which is faster than the second gear range, and when the continuously variable transmission device 18B is changed in speed from −MAX toward +MAX, the rotational speed V of the output shaft 38 steplessly increases from the third gear range minimum speed V2 to the third gear range maximum speed V3.

In a case where the fourth clutch CL4 of the four stage-divided clutches CL1 to CL4 is put in an engaged state and the continuously variable transmission device 18B is subject to a speed change operation, the power of a third output shaft 37c is changed in speed by a fourth gear interlocking mechanism 39d and the fourth clutch CL4 and output from the output shaft 38. As illustrated in FIG. 12, the rotational speed of the output shaft 38 corresponds to the rotational speed of the fourth gear range, which is faster than the third gear range, and when the continuously variable transmission device 18B is changed in speed from +MAX toward −MAX, the rotational speed V of the output shaft 38 steplessly increases from the fourth gear range minimum speed V3 to the fourth gear range maximum speed V4.

Forward/Reverse Switching Device

As illustrated in FIG. 2, the forward/reverse switching device 20 is provided with an input shaft 40 interlockingly joined to the output shaft 38 of the stage-divided transmission unit 19, a forward clutch CLF and a rearward clutch CLR provided on the input shaft 40, and an output shaft 42 joined to the forward clutch CLF via a forward gear mechanism 41f and joined to the rearward clutch CLR via a rearward gear mechanism 41r.

In the forward/reverse switching device 20, when the forward clutch CLF is put in an engaged state, the power transmitted from the stage-divided transmission unit 19 to the input shaft 40 is converted in forward travel motive power via the forward clutch CLF and the forward gear mechanism 41f and output from the output shaft 42. When the rearward clutch CLR is put in an engaged state, the power transmitted from the stage-divided transmission unit 19 to the input shaft 40 is converted in reverse travel motive power via the rearward clutch CLR and the rearward gear mechanism 41r and output from the output shaft 42.

The forward travel motive power and the reverse travel motive power output from the output shaft 42 is transmitted to the rear wheel gear interlocking mechanism 21 and transmitted to the input shaft 22a of the rear wheel differential mechanism 22 via the rear wheel gear interlocking mechanism 21.

Front Wheel Transmission Device

As illustrated in FIG. 2, the front wheel transmission device 26 is provided with an input shaft 43 joined to the input shaft 22a of the rear wheel differential mechanism 22 via the front wheel gear interlocking mechanism 25, a constant speed clutch CLT and an acceleration clutch CLH provided on the input shaft 43, and an output shaft 45 joined to the constant speed clutch CLT via a constant speed gear mechanism 44a and joined to the acceleration clutch CLH via an acceleration gear mechanism 44b.

In the front wheel transmission device 26, when the constant speed clutch CLT is put in an engaged state, the power transmitted from the input shaft 22a of the rear wheel differential mechanism 22 to the input shaft 43 is transmitted to the output shaft 45 via the constant speed clutch CLT and the constant speed gear mechanism 44a and transmitted from the output shaft 45 to the front wheel differential mechanism 28. This activates a front/rear wheel equal speed four-wheel drive state in which the left/right pair of front wheels 6 and the left/right pair of rear wheels 7 are driven with the average circumferential speed of the left/right pair of front wheels 6 and the average circumferential speed of the left/right pair of rear wheels 7 being substantially equal. When the acceleration clutch CLH is put in an engaged state, the power transmitted from the input shaft 22a of the rear wheel differential mechanism 22 to the input shaft 43 is transmitted to the output shaft 45 via the acceleration clutch CLH and the acceleration gear mechanism 44b and transmitted from the output shaft 45 to the front wheel differential mechanism 28. This activates a front wheel acceleration four-wheel drive state in which the left/right pair of front wheels 6 and the left/right pair of rear wheels 7 are driven with the average circumferential speed of the left/right pair of front wheels 6 being greater than the average circumferential speed of the left/right pair of rear wheels 7.

Planetary Gear Device

As illustrated in FIGS. 2 and 3, the planetary gear device 18A is provided with the two planetary gear device units 50, 60 that are disposed side by side in the front-and-rear direction of the transmission case 3. The planetary gear device 18A is constituted by a compound planetary gear device. Herein, the front planetary gear device unit 50 of the two planetary gear device units 50, 60 is referred to as a first planetary gear device unit 50, and the rear planetary gear device unit 60 of the two planetary gear device units 50, 60 is referred to as a second planetary gear device unit 60.

First Planetary Gear Device Unit

As illustrated in FIGS. 2 and 3, the first planetary gear device unit 50 includes a first sun gear 51, first planetary gears 52 that mesh with the first sun gear 51, a first internal gear 53 that meshes with the first planetary gears 52, and a carrier 70 that rotatably supports the first planetary gears 52 and rotates together with the first planetary gears 52 revolving around the first sun gear 51 with an axial core X (see FIG. 4) of the first sun gear 51 as its center of rotation.

As illustrated in FIG. 3, the first sun gear 51 is rotatably supported by a sun support shaft constituted by the rotary shaft 31. Herein, the rotary shaft 31 is referred to as a sun support shaft 31. As illustrated in FIG. 2, the first sun gear 51 is interlockingly joined to the third gear interlocking mechanism 36. Specifically, as illustrated in FIG. 3, a boss portion 51a provided on the first sun gear 51 extends from the carrier 70 to the front side, and a transmission gear 36a of the third gear interlocking mechanism 36 is interlockingly joined to an extension portion of the boss portion 51a. The boss portion 51a and the transmission gear 36a are interlockingly joined via a spline engagement.

Figure 4:
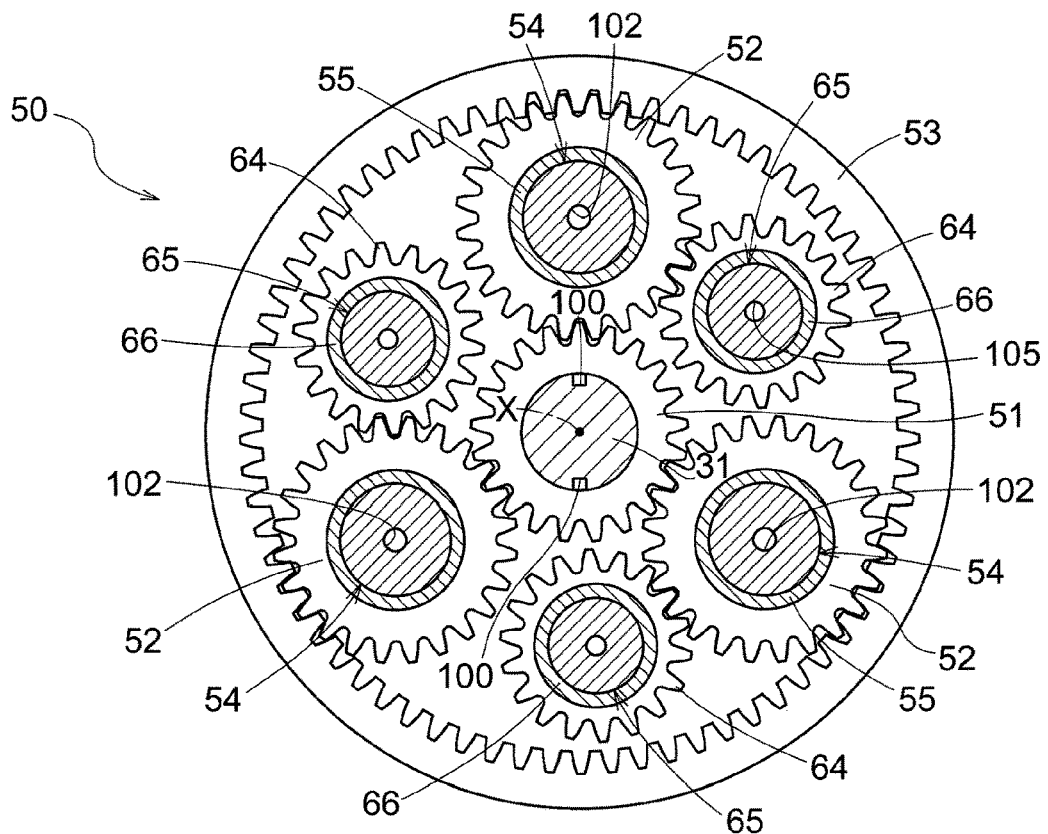
FIG. 4 is a front view illustrating a first sun gear, first planetary gears, a first internal gear, and transmission gears.

As illustrated in FIG. 4, the first planetary gears 52 are provided at three sections around the first sun gear 51. As illustrated in FIG. 3, the first planetary gears 52 are each rotatably supported by first planetary support shafts 54. A bush 55 is provided between each first planetary gear 52 and the first planetary support shaft 54.

As illustrated in FIG. 3, the first internal gear 53 is rotatably supported by the boss portion 51a of the first sun gear 51. Specifically, a boss portion 53a of the first internal gear 53 fits onto the boss portion 51a, interposed by a cylindrical member 56 located between the boss portion 53a and the boss portion 51a of the first sun gear 51. As illustrated in FIG. 2, the first internal gear 53 is interlockingly joined to the first gear interlocking mechanism 34. Specifically, as illustrated in FIG. 3, the boss portion 53a of the first internal gear 53 and the cylindrical member 56 are interlockingly joined via a spline engagement, and the cylindrical member 56 and a transmission gear 34a of the first gear interlocking mechanism 34 are interlockingly joined via a spline engagement.

Second Planetary Gear Device Unit

Figure 5:
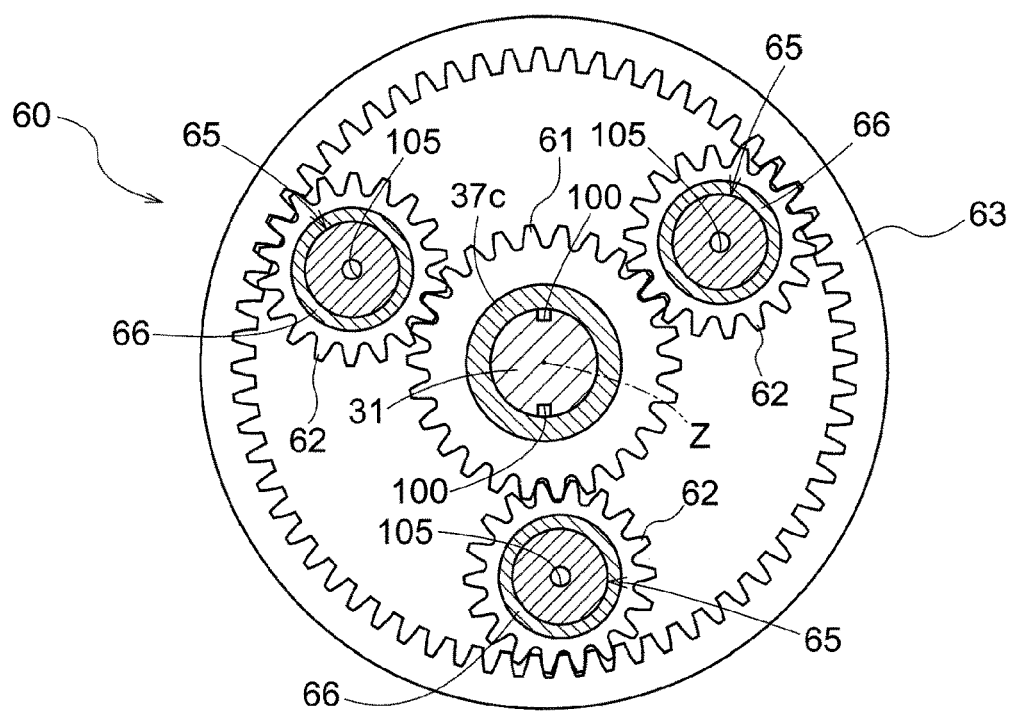
FIG. 5 is a rear view illustrating a second sun gear, second planetary gears, and a second internal gear.

As illustrated in FIGS. 2 and 5, the second planetary gear device unit 60 includes a second sun gear 61, second planetary gears 62 that mesh with the second sun gear 61, a second internal gear 63 that meshes with the second planetary gears 62, a transmission gear 64 (see FIG. 4) that meshes with the first planetary gears 52 and transmits the rotation of the first planetary gears 52 to the second planetary gears 62, and the carrier 70 that rotatably supports the second planetary gears 62 and rotates together with the second planetary gears 62 revolving around the second sun gear 61 with an axial core Z (see FIG. 5) of the second sun gear 61 as its center of rotation.

As illustrated in FIG. 3, the second sun gear 61 is supported by a portion of the third output shaft 37c inside the carrier 70. The axial core Z of the second sun gear 61 is coaxially positioned with the axial core of the first sun gear 51. The axial core Z of the second sun gear 61 and the axial core X of the first sun gear 51 are the same axial core. As illustrated in FIG. 2, the second sun gear 61 is interlockingly joined to the third output shaft 37c. As illustrated in FIG. 3, the second sun gear 61 and the third output shaft 37c are interlockingly joined via a spline engagement.

As illustrated in FIG. 5, the second planetary gears 62 are provided at three sections around the second sun gear 61. The number of second planetary gears 62 is the same as the number of first planetary gears 52. As illustrated in FIG. 3, the second planetary gears 62 are each rotatably supported by second planetary support shafts 65.

As illustrated in FIG. 4, the transmission gear 64 is providing corresponding to the three first planetary gears 52 and the three second planetary gears 62. The number of transmission gears 64 is the same as the number of first planetary gears 52 and the number of second planetary gears 62. As illustrated in FIG. 3, the transmission gears 64 are supported by portions of the second planetary support shafts 65 located on the front side of the second planetary gears 62. The transmission gears 64 are interlockingly joined to the second planetary gears 62, and the rotation of the first planetary gears 52 input via the meshing with the first planetary gears 52 is transmitted to the second planetary gears 62. A bush 66 is provided between the second planetary gears 62 and the second planetary support shafts 65 and between the transmission gears 64 and the second planetary support shafts 65. In the present embodiment, the transmission gears 64 and the second planetary gears 62 are interlockingly joined by the transmission gears 64 and the second planetary gears 62 being integrally formed. The transmission gears 64 and the second planetary gears 62 may be interlockingly joined via the second planetary support shafts 65.

As illustrated in FIGS. 2 and 3, the second internal gear 63 is supported by a front portion of the first output shaft 37a and interlockingly joined to the first output shaft 37a. Specifically, the second internal gear 63 and the first output shaft 37a are interlockingly joined via a spline engagement between a boss portion 63a provided on the second internal gear 63 and the first output shaft 37a.

Configuration of Carrier

The carrier 70 of the first planetary gear device unit 50 and the carrier 70 of the second planetary gear device unit 60 are constituted by the same carrier 70. The carrier 70 is configured as follows.

As illustrated in FIG. 3, the carrier 70 is supported by the boss portion 53a of the first internal gear 53 and the boss portion 63a of the second internal gear 63. A ball bearing 71 is provided between the carrier 70 and the boss portion 53a, and a ball bearing 72 is provided between the carrier 70 and the boss portion 63a. The carrier 70 is rotatably supported by the boss portion 53a and the boss portion 63a, rotates together with the first planetary gears 52 that revolve around the first sun gear 51 with the axial core X of the first sun gear 51 as its center of rotation (see FIG. 4), and rotates together with the second planetary gears 62 that revolve around the second sun gear 61 with the axial core Z of the second sun gear 61 as its center of rotation (see FIG. 5).

As illustrated in FIG. 3, the carrier 70 is provided with a first carrier portion 70A that houses the first planetary support shafts 54, the second planetary support shafts 65, the first sun gear 51, the second sun gear 61, the first planetary gears 52, the second planetary gears 62, and the transmission gears 64 and a second carrier portion 70B constituting a cover body for the first carrier portion 70A.

Figure 6:
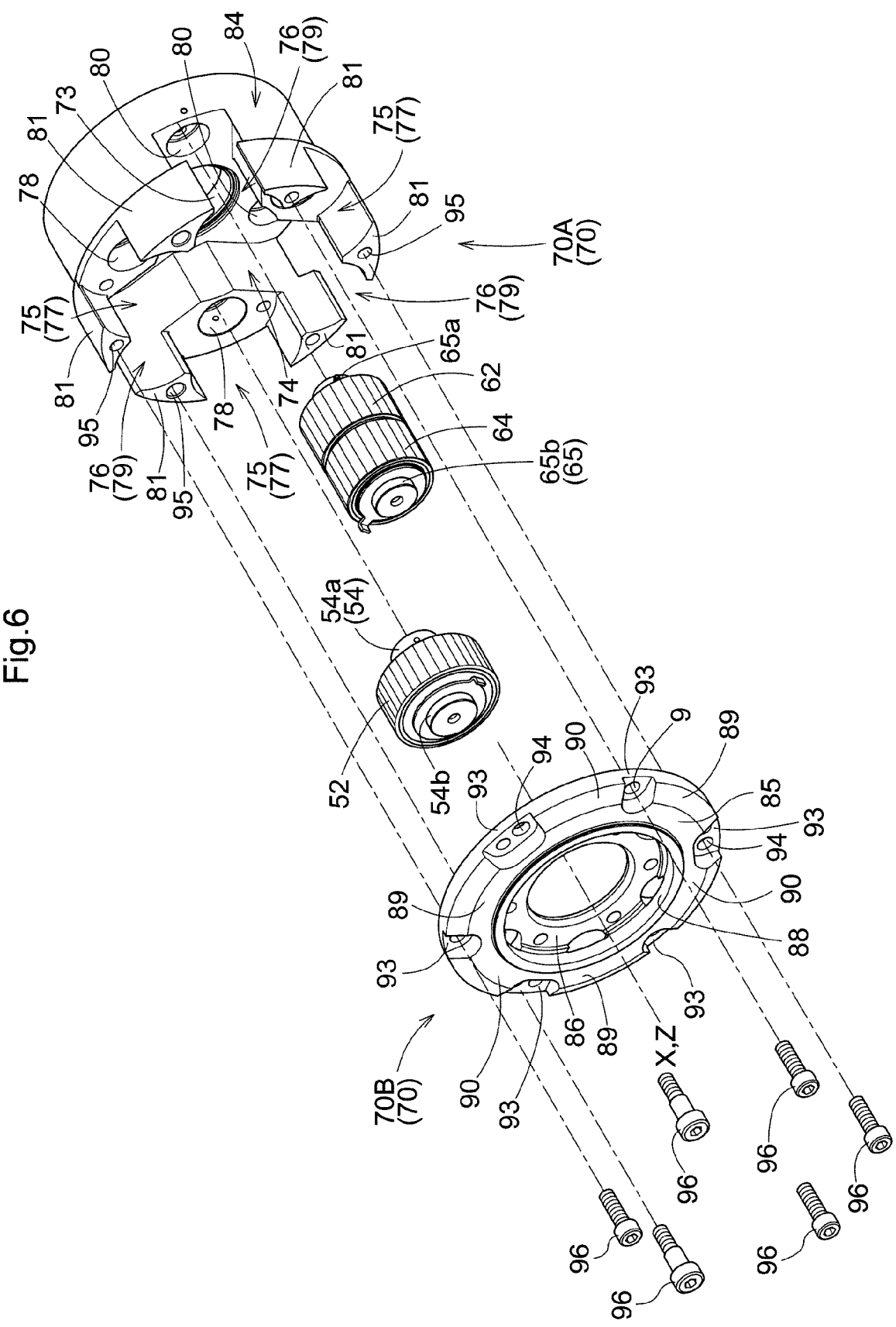
FIG. 6 is an exploded perspective view illustrating the first planetary gears, the second planetary gears, the transmission gears, and the carrier.

As illustrated in FIG. 6, the first carrier portion 70A and the second carrier portion 70B are separable in the axial core direction of the first sun gear 51 and the axial core direction of the second sun gear 61.

As illustrated in FIG. 6, the center portion of the first carrier portion 70A is provided with a first through-hole 73 into which the sun support shaft 31 is inserted, the front portion of the second output shaft 37b is fit into, and the front portion of the third output shaft 37c is fit into. The first through-hole 73 is formed as a spline hole that engages with a spline shaft portion 37s (see FIG. 3) of the second output shaft 37b. At a section on the second carrier portion side (front side) of the first through-hole 73, a sun gear housing space 74 that houses the first sun gear 51 and the second sun gear 61 is provided communicating with the first through-hole 73. The sun gear housing space 74 opens toward the second carrier portion side and the first sun gear 51 and the second sun gear 61 can be inserted in the sun gear housing space 74 from the second carrier portion side (front side).

Three first gear housing spaces 75 that separately house the three first planetary gears 52 and three second gear housing spaces 76 that separately house the three second planetary gears 62 are provided at sections around the sun gear housing space 74. The three first gear housing spaces 75 and the three second gear housing spaces 76 are disposed side by side in the carrier circumferential direction with one second gear housing space 76 located between two first gear housing spaces 75.

Figure 8:
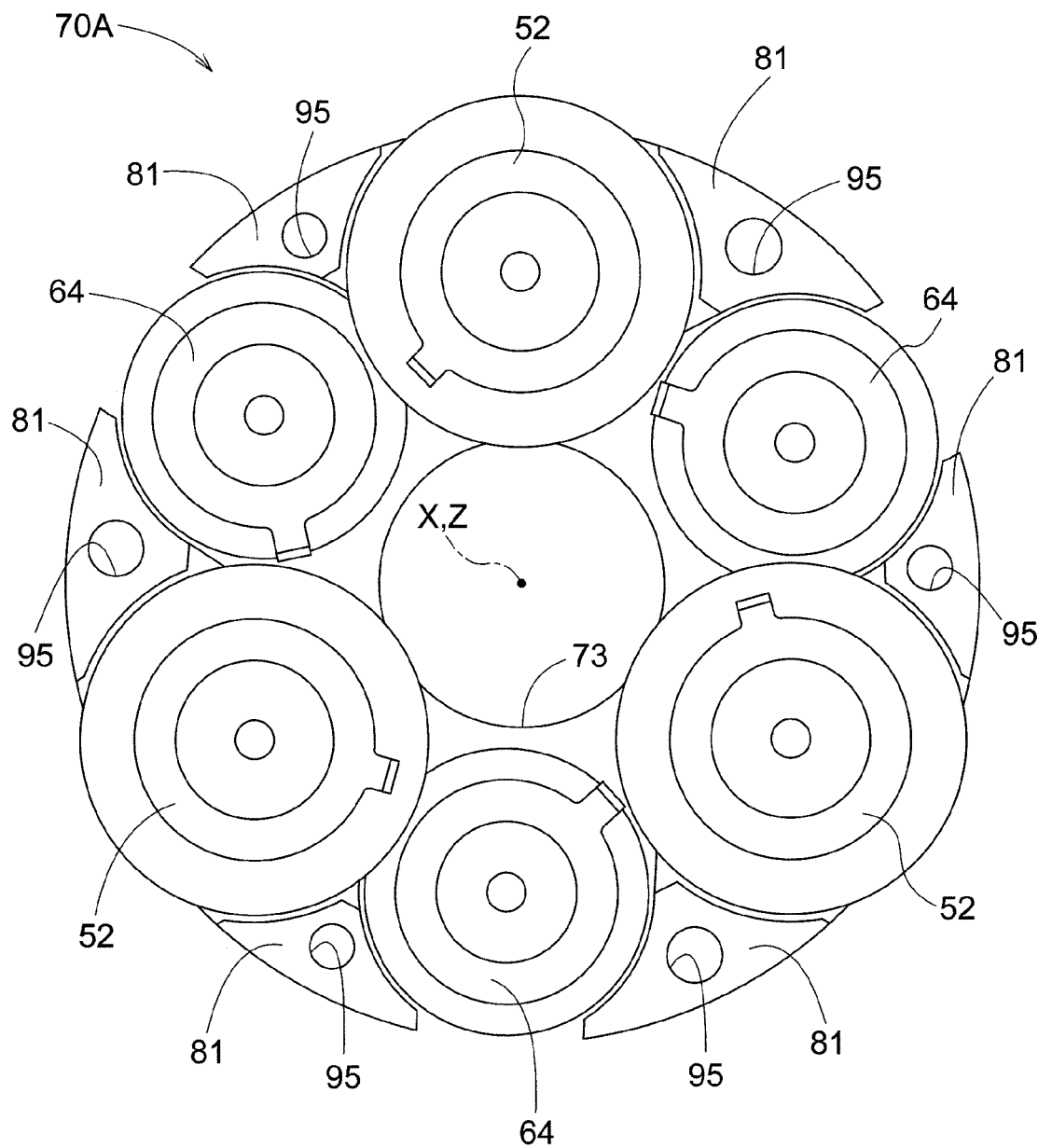
FIG. 8 is a front view illustrating a first carrier portion with the first planetary gears, the transmission gears, and the second planetary gears installed.

The second gear housing spaces 76 are configured to house the transmission gears 64. The depth of the second gear housing spaces 76 in the direction aligned with the direction of the axial core of the first sun gear 51 is greater than the depth of the first gear housing spaces 75 in the direction aligned with the direction of the axial core of the first sun gear 51. As illustrated in FIG. 8, the first gear housing spaces 75 and the second gear housing spaces 76 communicate with one another in the carrier circumferential direction in a manner such that the first planetary gears 52 and the transmission gears 64 can mesh with one another.

Figure 7:
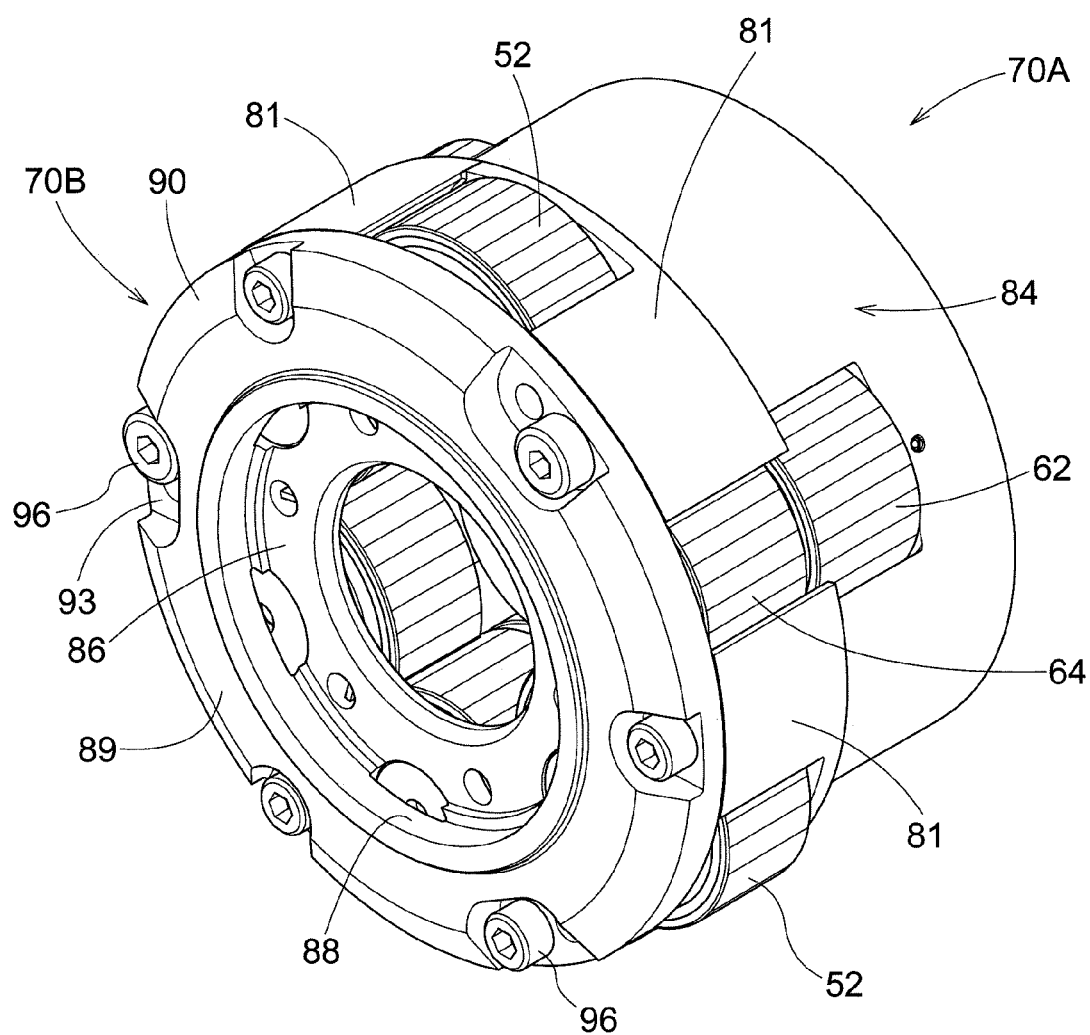
FIG. 7 is a perspective view illustrating a completed carrier.

As illustrated in FIGS. 7 and 8, the first gear housing spaces 75 are configured such that the portions of the first planetary gears 52 that mesh with the first internal gear 53 project from the first gear housing spaces 75 to the carrier outer circumferential side. The second gear housing spaces 76 are configured such that the portions of the second planetary gears 62 that meshes with the second internal gear 63 project from the second gear housing spaces 76 to the carrier outer circumferential side.

As illustrated in FIG. 6, a first opening 77 is provided on the end portions of the first gear housing spaces 75 on the second carrier portion side (front end portion). The first opening 77 opens the first gear housing spaces 75 to the second carrier portion 70B and allows the first planetary gears 52 to be inserted in the first gear housing spaces 75.

A first support shaft first support hole 78 is provided at the portion of the first carrier portion 70A on the opposite side to the side where the first opening 77 is located with respect to the first gear housing spaces 75. The first support shaft first support hole 78 supports a first support shaft first end portion 54a (see FIGS. 3 and 6), of the first planetary support shaft 54, located on the first planetary support shaft first end side of the first planetary gears 52. The first support shaft first support hole 78 is provided communicating with the first gear housing spaces 75.

As illustrated in FIG. 6, a second opening 79 is provided on the end portions of the second gear housing spaces 76 on the second carrier portion side (front end portion). The second opening 79 opens the second gear housing spaces 76 to the second carrier portion 70B and allows the second planetary gears 62 and the transmission gears 64 to be inserted in the second gear housing spaces 76. A second support shaft first support hole 80 is provided at the portion of the first carrier portion 70A on the opposite side to the side where the second opening 79 is located with respect to the second gear housing spaces 76. The second support shaft first support hole 80 supports a second support shaft first end portion 65a of the second planetary support shaft 65 (see FIGS. 3 and 6) located on second planetary support shaft first end side of the transmission gears 64 and on the second planetary support shaft first end side of the second planetary gears 62. The second support shaft first support hole 80 is provided communicating with the second gear housing spaces 76.

As illustrated in FIG. 6, a reinforcing portion 81 is provided in the first carrier portion 70A between the portions on the carrier radial direction outer side of the first gear housing spaces 75 and the portions on the carrier radial direction outer side of the second gear housing spaces 76. The reinforcing portion 81 is provided at six sections. The reinforcing portions 81 are integrally formed with the first carrier portion 70A. As illustrated in FIG. 8, the reinforcing portion 81 is located between the outer circumferential portions of the first planetary gears 52 and the outer circumferential portions of the transmission gears 64.

As illustrated in FIG. 3, a recessed insertion portion 82 is provided at the rear portion of the first carrier portion 70A at the portion located to the rear side of the sun gear housing space 74. The front portion of the first output shaft 37a, the boss portion 63a of the second internal gear 63, and the ball bearing 72 are fit into the recessed insertion portion 82.

The first carrier portion 70A is made by casting, with an outer circumferential portion 84 (see FIG. 6) of the first carrier portion 70A being turned after casting. The mass of the first carrier portion 70A about the axial core X of the first sun gear 51 and the axial core Z of the second sun gear 61 is made uniform to prevent rotary vibration of the carrier 70.

Figure 10:
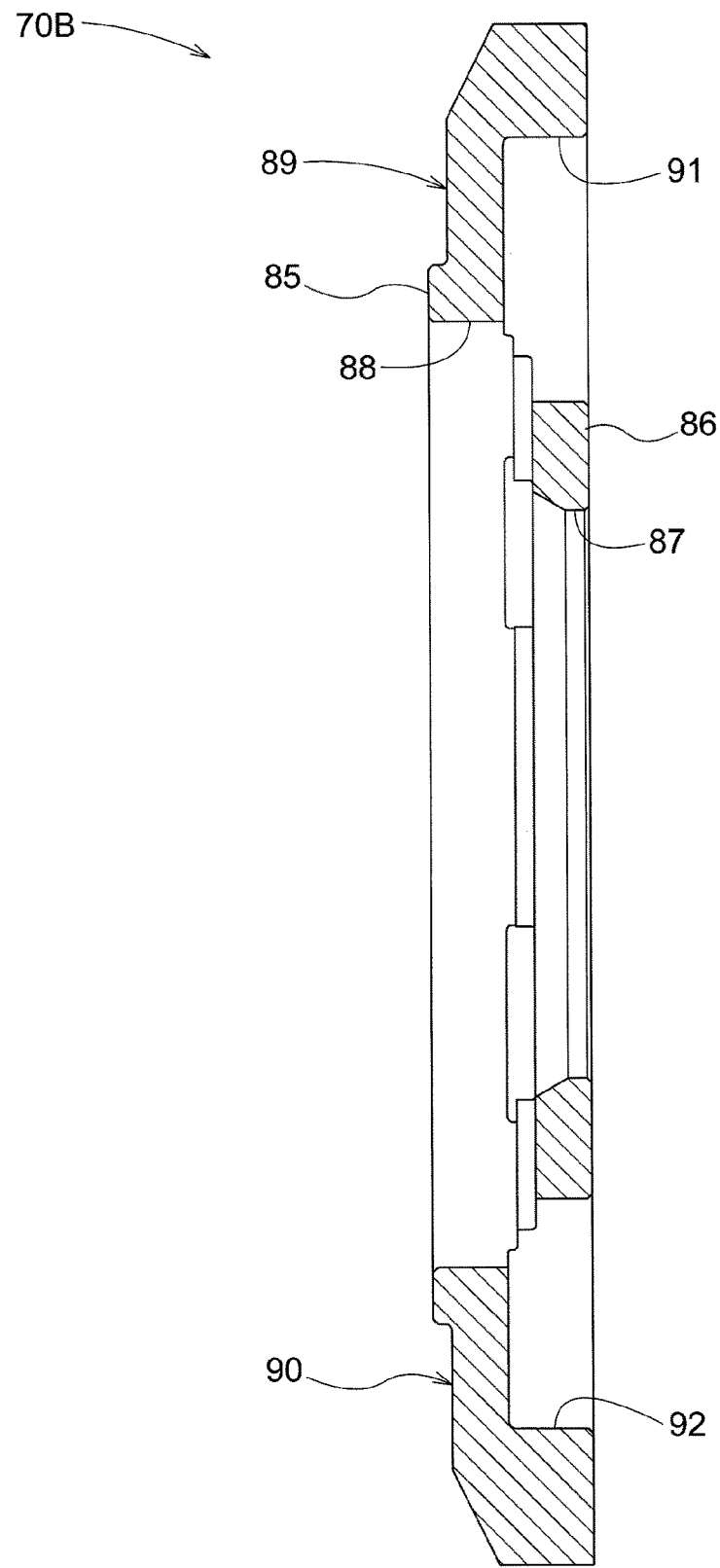
FIG. 10 is a vertical cross-sectional view illustrating a second carrier portion.
Figure 11:
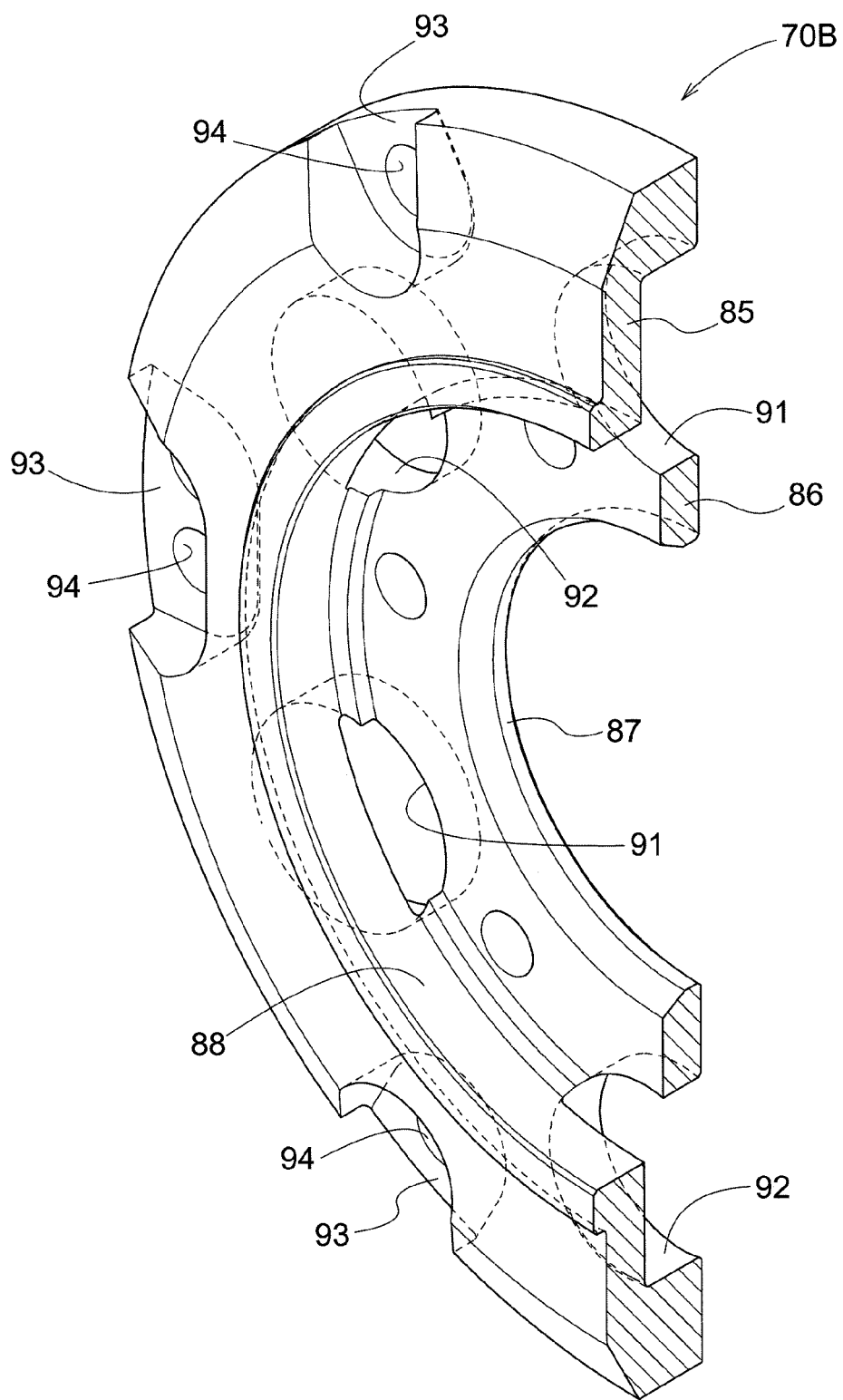
FIG. 11 is a perspective view illustrating a portion of the second carrier portion.

As illustrated in FIGS. 6, 10, and 11, the second carrier portion 70B is provided with an outer wall portion 85 and an inner wall portion 86. The outer wall portion 85 and the inner wall portion 86 are connected at the outer circumferential portion of the second carrier portion 70B. As illustrated in FIGS. 3, 6, and 10, a second through-hole 87 that extends through the boss portion 51a of the first sun gear 51 is provided in the center portion of the inner wall portion 86. A third through-hole 88 is provided in the center portion of the outer wall portion 85. The boss portion 51a of the first sun gear 51 is inserted in the third through-hole 88, and the rear portion of the cylindrical member 56, the boss portion 53a of the first internal gear 53, and the ball bearing 71 fit into the third through-hole 88. A first cover portion 89 that covers the first opening 77 of the first gear housing spaces 75 and a second cover portion 90 that covers the second openings 79 of the second gear housing spaces 76 are provided around the second through-hole 87 in the second carrier portion 70B.

As illustrated in FIGS. 10 and 11, a first support shaft second support hole 91 that supports a first support shaft second end portion 54b (see FIGS. 3 and 6), of the first planetary support shaft 54, located on the first planetary support shaft second end side of the first planetary gears 52 is provided on the first cover portion 89. The first support shaft second support hole 91 opens toward the first gear housing spaces 75 and communicates with the first gear housing spaces 75 by the second carrier portion 70B being joined to the first carrier portion 70A. A second support shaft second support hole 92 is provided on the second cover portion 90. The second support shaft second support hole 92 supports a second support shaft second end portion 65b of the second planetary support shaft 65 (see FIGS. 3 and 6) located on the second planetary support shaft second end side of the second planetary gears 62 and located on the second planetary support shaft second end side of the transmission gears 64. The second support shaft second support hole 92 opens toward the second gear housing spaces 76 and communicates with the second gear housing spaces 76 by the second carrier portion 70B being joined to the first carrier portion 70A.

As illustrated in FIGS. 6 and 11, a joining portion 93 for joining the second carrier portion 70B to the first carrier portion 70A is provided at a portion of the second carrier portion 70B around the third through-hole 88. The joining portion 93 is provided at six sections corresponding to the six reinforcing portions 81. As illustrated in FIG. 7, the joining portions 93 are tightened against the reinforcing portions 81 using joining bolts 96 (see FIG. 6) that are installed as screw members into bolt holes 94 (see FIG. 6) provided on the joining portions 93 and screw holes 95 (see FIG. 6) provided on the reinforcing portions 81. The joining bolts 96 each include an axial core aligned with the direction of the axial core of the first sun gear 51. The reinforcing portions 81 are tightened and joined to the first carrier portion 70A in the direction aligned with the direction of the axial core of the first sun gear 51, joining the second carrier portion 70B to the first carrier portion 70A.

The carrier 70 can be obtained using the following assembly method.

As illustrated in FIG. 6, the first planetary gears 52 attached to the first planetary support shaft 54 are inserted from the first opening 77 into the first gear housing spaces 75, and the first support shaft first end portion 54a of the first planetary support shaft 54 is inserted into the first support shaft first support hole 78. Accordingly, the first support shaft first end portion 54a is supported by the first support shaft first support hole 78. Also, the first support shaft first end portion 54a is supported by the first carrier portion 70A.

As illustrated in FIG. 6 the second planetary gears 62 and the transmission gears 64 attached to the second planetary support shaft 65 are inserted from the second opening 79 into the second gear housing spaces 76, and the second support shaft first end portion 65a of the second planetary support shaft 65 is inserted into the second support shaft first support hole 80. Accordingly, the second support shaft first end portion 65a is supported by the second support shaft first support hole 80. In other words, the second support shaft first end portion 65a is supported by the first carrier portion 70A.

In this manner, the three first planetary gears 52 are inserted into the first gear housing spaces 75, the first support shaft first end portions 54a of the three first planetary support shafts 54 are supported by the first support shaft first support holes 78, the three second planetary gears 62 and the three transmission gears 64 are inserted into the second gear housing spaces 76, and the second support shaft first end portions 65a of the three second planetary support shafts 65 are supported by the second support shaft first support holes 80.

Next, the second carrier portion 70B is aligned with the first planetary support shafts 54 and the second planetary support shafts 65 such that the first support shaft second support holes 91 face the first support shaft second end portions 54b of the first planetary support shafts 54 and the second support shaft second support holes 92 face the second support shaft second end portions 65b of the second planetary support shafts 65, and then at the joining portions 93, the joining bolts 96 installed in the bolt holes 94 and the screw holes 95 are tightened. As the joining portions 93 are tightened against the reinforcing portions 81 (the first carrier portion 70A), the first support shaft second end portions 54b of the first planetary support shafts 54 are fitted into the first support shaft second support holes 91 and the second support shaft second end portions 65b of the second planetary support shafts 65 are fitted into the second support shaft second support holes 92.

When tightening of the joining bolts 96 is complete, the joining portions 93 are tightened and joined to the reinforcing portions 81, the first planetary gears 52 are housed in the first gear housing spaces 75 and the second planetary gears 62 and the transmission gears 64 are housed in the second gear housing spaces 76, the first opening 77 and the second opening 79 are covered by the second carrier portion 70B, the first carrier portion 70A and the second carrier portion 70B are interlocked, and the first sun gear 51 rotates about the axial core X and the second sun gear 61 rotates about the axial core Z, thus forming the carrier 70. Also, the carrier 70 is formed with the first carrier portion 70A and the second carrier portion 70B joined via the reinforcing portions 81 and reinforced via the reinforcing portions 81.

Lubricating Oil Supply Configuration

Figure 9:
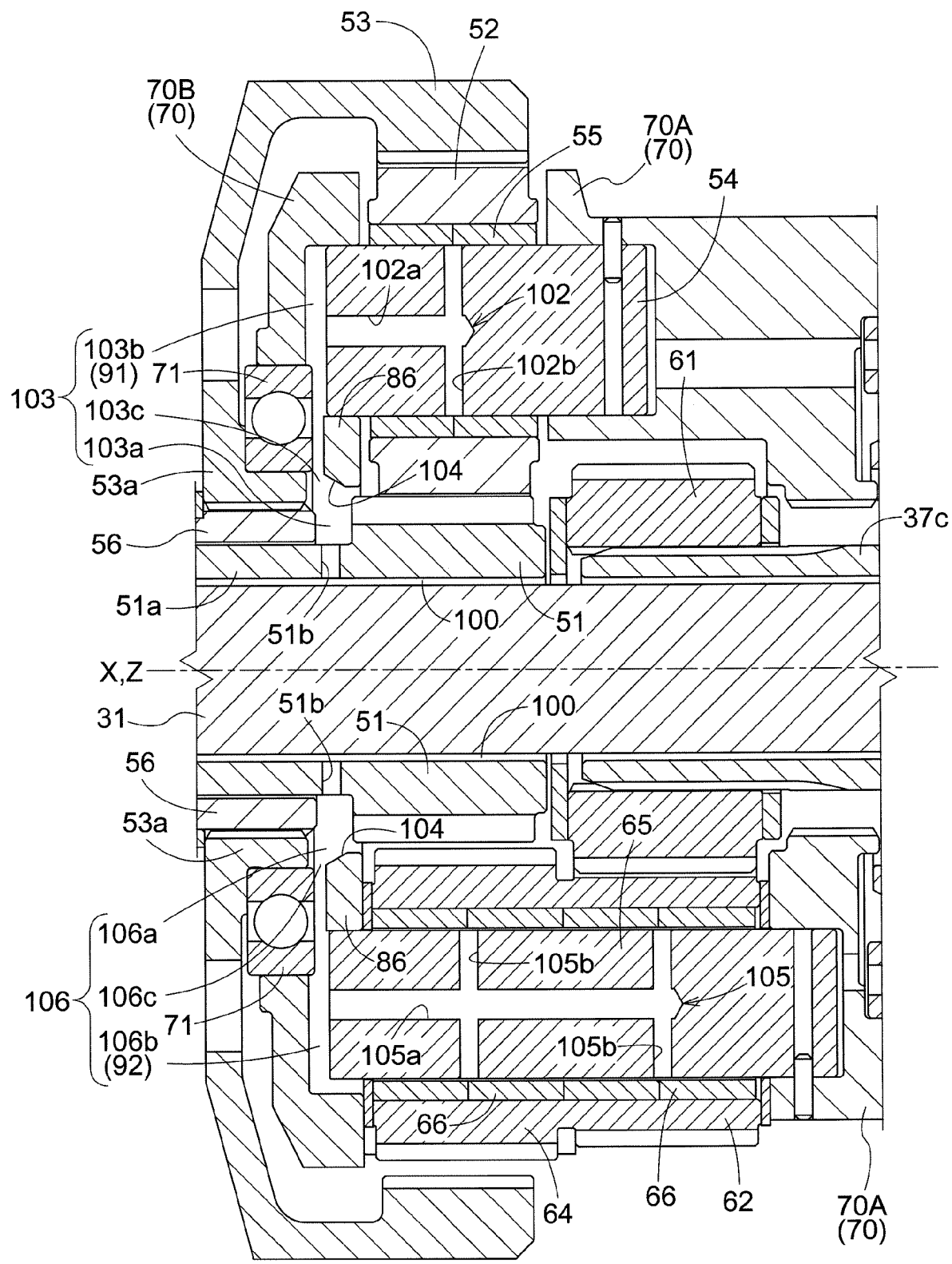
FIG. 9 is a cross-sectional view illustrating an oil supply structure.

As illustrated in FIGS. 3 and 9, a sun oil supply passage 100 for supplying lubricating oil between the sun support shaft 31 and the first sun gear 51 is provided at the outer circumferential portion of the sun support shaft 31 that supports the first sun gear 51. The sun oil supply passage 100 is provided at two sections in the circumferential direction of the sun support shaft 31. The sun oil supply passage 100 is provided extending in a linear manner along the axial core of the sun support shaft 31 between the third output shaft 37c and the sun support shaft 31 and is configured to allow oil to be supplied between the third output shaft 37c and the sun support shaft 31.

As illustrated in FIG. 3, the sun oil supply passage 100 is supplied with oil from an oil supply passage 101 machined into a cylindrical portion 17a that fits onto the front end portion of the sun support shaft 31. The cylindrical portion 17a is provided on the rear portion of the input shaft 17.

As illustrated in FIGS. 3 and 9, a first planetary oil supply passage 102 for supplying lubricating oil between the first planetary support shafts 54 and the first planetary gears 52 is provided at the first planetary support shafts 54. The first planetary oil supply passage 102 is provided on the three first planetary support shafts 54. Specifically, as illustrated in FIG. 9, the first planetary oil supply passage 102 is provided with an upstream oil supply portion 102a machined into the first planetary support shaft 54 running in the direction of the axial core of the first planetary support shaft 54 and a downstream oil supply portion 102b machined into the first planetary support shaft 54 running orthogonal to the axial core of the first planetary support shaft 54 and connecting the upstream oil supply portion 102a to two sections around the outer circumference of the first planetary support shaft 54.

In the first planetary oil supply passage 102, lubricating oil is supplied to the upstream oil supply portion 102a and runs from the upstream oil supply portion 102a to the downstream oil supply portion 102b and is supplied from the downstream oil supply portion 102b to the bush 55 located between the first planetary support shafts 54 and the first planetary gears 52. In this manner, lubricating oil is supplied between the first planetary support shafts 54 and the first planetary gears 52.

As illustrated in FIGS. 3 and 9, the first planetary oil supply passage 102 is connected to the sun oil supply passage 100 via a first oil supply passage 103 provided inside the carrier 70. The first oil supply passage 103 is provided extending in the radial direction of the carrier 70 and along the carrier 70 (the second carrier portion 70B), lubricating oil from the sun oil supply passage 100 is taken in via the rotation of the carrier 70, and the taken in lubricating oil is supplied to the first planetary oil supply passage 102. In other words, the lubricating oil located at the first oil supply passage 103 is affected by a centrifugal force via the rotation of the carrier 70 and runs toward the first planetary oil supply passage 102. When the lubricating oil runs in this manner, the lubricating oil of the sun oil supply passage 100 is taken in by the first oil supply passage 103 and supplied from the first oil supply passage 103 to the first planetary oil supply passage 102.

The first oil supply passage 103 is provided with a first upstream oil passage portion 103a that opens to the sun oil supply passage 100, a first downstream oil passage portion 103b that opens to the first planetary oil supply passage 102, and a first connection oil passage portion 103c that connects the first upstream oil passage portion 103a and the first downstream oil passage portion 103b. The first upstream oil passage portion 103a is formed by the front end portion of the first sun gear 51 and the rear end portion of the cylindrical member 56 and opens to the sun oil supply passage 100 via a through-hole 51b provided on the boss portion 51a of the first sun gear 51. The first downstream oil passage portion 103b is formed by the first support shaft second support hole 91 of the second carrier portion 70B, the inner wall portion 86, and the ball bearing 71. The width of the first downstream oil passage portion 103b in the direction aligned with the direction of the axial core of the first sun gear 51 is less than the width of the first upstream oil passage portion 103a in the direction aligned with the direction of the axial core of the first sun gear 51. The first connection oil passage portion 103c is formed by an inclined portion 104 provided on a portion of the inner wall portion 86 near the second through-hole 87 and the boss portion 53a of the first internal gear 53. The width of the first connection oil passage portion 103c in the direction aligned with the direction of the axial core of the first sun gear 51 is less on the first downstream oil supply portion side due to the inclined portion 104. The first connection oil passage portion 103c functions to throttle the lubricating oil running from the first upstream oil passage portion 103a to the first downstream oil passage portion 103b, and the first downstream oil passage portion 103b has a smaller width than the first upstream oil passage portion 103a. Thus, even when there is a change in the amount of oil in the first upstream oil passage portion 103a, the amount of oil in the first downstream oil passage portion 103b can be stabilized.

As illustrated in FIGS. 3 and 9, a second planetary oil supply passage 105 for supplying lubricating oil between the second planetary support shafts 65 and the transmission gears 64 and between the second planetary support shafts 65 and the second planetary gears 62 is provided at the second planetary support shafts 65. The second planetary oil supply passage 105 is provided on the three second planetary support shafts 65. Specifically, as illustrated in FIG. 9, the second planetary oil supply passage 105 is provided with an upstream oil supply portion 105a machined into the second planetary support shaft 65 running in the direction of the axial core of the second planetary support shaft 65 and two downstream oil supply portions 105b machined into the second planetary support shaft 65 running orthogonal to the axial core of the second planetary support shaft 65, the two downstream oil supply portions 105b being separately connecting the upstream oil supply portion 105a to a portion of the outer circumferential region of the second planetary support shaft 65 corresponding to the transmission gear 64 and to a portion of the outer circumferential region of the second planetary support shaft 65 corresponding to the second planetary gear 62. The downstream oil supply portion 105b opens at two sections in the outer circumferential region of the second planetary support shaft 65.

In the second planetary oil supply passage 105, lubricating oil is supplied to the upstream oil supply portion 105a and runs from the upstream oil supply portion 105a to the two downstream oil supply portions 105b, is supplied from one of the downstream oil supply portions 105b to the bush 66 located between the second planetary support shafts 65 and the transmission gears 64 to supply between the second planetary support shafts 65 and the transmission gears 64, and is supplied from the other downstream oil supply portion 105b to the bush 55 located between the second planetary support shafts 65 and the second planetary gears 62 to supply between the second planetary support shafts 65 and the second planetary gears 62.

As illustrated in FIGS. 3 and 9, the second planetary oil supply passage 105 is connected to the sun oil supply passage 100 via a second oil supply passage 106 provided inside the carrier 70. The second oil supply passage 106 is provided extending in the radial direction of the carrier 70 and along the carrier 70 (the second carrier portion 70B), lubricating oil from the sun oil supply passage 100 is taken in via the rotation of the carrier 70, and the taken in lubricating oil is supplied to the second planetary oil supply passage 105. In other words, the lubricating oil located at the second oil supply passage 106 is affected by a centrifugal force via the rotation of the carrier 70 and runs toward the second planetary oil supply passage 105. When the lubricating oil runs in this manner, the lubricating oil of the sun oil supply passage 100 is taken in by the second oil supply passage 106 and supplied from the second oil supply passage 106 to the second planetary oil supply passage 105.

The second oil supply passage 106 is provided with a second upstream oil passage portion 106a that opens to the sun oil supply passage 100, a second downstream oil passage portion 106b that opens to the second planetary oil supply passage 105, and a second connection oil passage portion 106c that connects the second upstream oil passage portion 106a and the second downstream oil passage portion 106b. The second upstream oil passage portion 106a is formed by the front end portion of the first sun gear 51 and the rear end portion of the cylindrical member 56 and opens to the sun oil supply passage 100 via the through-hole 51b provided on the boss portion 51a of the first sun gear 51. The second downstream oil passage portion 106b is formed by the second support shaft second support hole 92 of the second carrier portion 70B, the inner wall portion 86, and the ball bearing 71. The width of the second downstream oil passage portion 106b in the direction aligned with the direction of the axial core of the first sun gear 51 is less than the width of the second upstream oil passage portion 106a in the direction aligned with the direction of the axial core of the first sun gear 51. The second connection oil passage portion 106c is formed by the inclined portion 104 provided on a portion of the inner wall portion 86 near the second through-hole 87 and the boss portion 53a of the first internal gear 53. The width of the second connection oil passage portion 106c in the direction aligned with the direction of the axial core of the first sun gear 51 is less on the second downstream oil supply portion side due to the inclined portion 104. The second connection oil passage portion 106c functions to throttle the lubricating oil running from the second upstream oil passage portion 106a to the second downstream oil passage portion 106b, and the second downstream oil passage portion 106b has a smaller width than the second upstream oil passage portion 106a. Thus, even when there is a change in the amount of oil in the second upstream oil passage portion 106a, the amount of oil in the second downstream oil passage portion 106b can be stabilized.

In the present embodiment, the first oil supply passage 103 that supplies oil to the three first planetary oil supply passages 102 and the second oil supply passage 106 that supplies oil to the three second planetary oil supply passages 105 are provided communicating with one another in the circumferential direction of the carrier 70.

The lubricating oil supplied from the oil supply passage 101 to the sun oil supply passage 100 is supplied from the sun oil supply passage 100 to between the sun support shaft 31 and the first sun gear 51. Also, the lubricating oil is supplied from the sun oil supply passage 100 to between the sun support shaft 31 and the third output shaft 37c. When the carrier 70 rotates, the lubricating oil located at the sun oil supply passage 100 is taken into the first oil supply passage 103 and supplied from the first oil supply passage 103 to the first planetary oil supply passage 102, and then supplied from the first planetary oil supply passage 102 to between the first planetary support shafts 54 and the first planetary gears 52. Also, when the carrier 70 rotates, the lubricating oil located at the sun oil supply passage 100 is taken into the second oil supply passage 106 and supplied from the second oil supply passage 106 to the second planetary oil supply passage 105, and then supplied from the second planetary oil supply passage 105 to between the second planetary support shafts 65 and the transmission gears 64 and to between the second planetary support shafts 65 and the second planetary gears 62.

Other Embodiments (1) In the embodiment described above, three planetary gears (first planetary gears) 52 and three second planetary gears 62 are provided. However, two or four or more planetary gears (first planetary gears) or second planetary gears may be provided.

(2) In the embodiment described above, the second sun gear 61, the second planetary gears 62, the second internal gear 63, and the transmission gears 64 are provided. However, only the sun gear (first sun gear) 51, the planetary gears (first planetary gears) 52, and the internal gear (first internal gear) 53 may be provided.

(3) In the embodiment described above, the first carrier portion 70A is made by casting and the outer circumferential portion of the first carrier portion 70A is formed by turning. However, no such limitation is intended. For example, casting may be used by turning not, or a method of manufacture other than casting may be used.

(4) In the embodiment described above, the downstream oil supply portion has less width than the upstream oil supply portion and the oil passage width of the connection oil passage portion is less on the downstream oil passage portion side and the second downstream oil passage portion has less width than the second upstream oil passage portion and the oil passage width of the second connection oil passage portion is less on the second downstream oil passage portion side. However, the width of the downstream oil passage portion and the width of the upstream oil passage portion may be the same and the width of the second downstream oil passage portion and the width of the second upstream oil passage portion may be the same.

INDUSTRIAL APPLICABILITY

The present invention can be applied to a planetary gear device provided in various vehicles including not only a tractor, but also a combine harvester, multi-purpose vehicle, and the like.

REFERENCE SIGNS LIST

50 First planetary gear device unit
51 Sun gear (first sun gear)
52 Planetary gear (first planetary gear)
53 Internal gear (first internal gear)
54 Planetary support shaft (first planetary support shaft)
54a First end portion (first support shaft first end portion)
54b Second end portion (first support shaft second end portion)
60 Second planetary gear device unit
61 Second sun gear
62 Second planetary gear
63 Second internal gear
64 Transmission gear
65 Second planetary support shaft
65a Second support shaft first end portion
65b Second support shaft second end portion
70 Carrier
70A First carrier portion
70B Second carrier portion
75 Gear housing space (first gear housing space)
76 Second gear housing space
77 Opening (first opening)
78 First support hole (first support shaft first support hole)
79 Second opening
80 Second support shaft first support hole
81 Reinforcing portion
89 Cover portion (first cover portion)
90 Second cover portion
91 Second support hole (first support shaft second support hole)
92 Second support shaft second support hole
93 Joining portion
96 Joining portion (screw member, joining bolt)
100 Sun oil supply passage
102 Planetary oil supply passage (first planetary oil supply passage)
103 Oil supply passage (first oil supply passage)
103a Upstream oil passage portion (first upstream oil passage portion)
103b Downstream oil passage portion (first downstream oil passage portion)
103c Connection oil passage portion (first connection oil passage portion)
105 Second planetary oil supply passage
106 Second oil supply passage
106a Second upstream oil passage portion
106b Second downstream oil passage portion
106c Second connection oil passage portion
X Axial core (first sun gear axial core)
Z Axial core (second sun gear axial core)

What is claimed is:

1. A planetary gear device, comprising:
a sun gear;
a planetary gear that meshes with the sun gear;
an internal gear that meshes with the planetary gear; and
a carrier that rotatably supports the planetary gear and rotates together with the planetary gear revolving around the sun gear with an axial core of the sun gear as its center of rotation,
wherein the carrier includes
a planetary support shaft that supports the planetary gear,
a first carrier portion that supports a first end portion of the planetary support shaft located on a planetary support shaft first end side of the planetary gear, and
a second carrier portion that supports a second end portion of the planetary support shaft located on a planetary support shaft second end side of the planetary gear;
the first carrier portion includes
a gear housing space that houses the planetary gear,
an opening that opens the gear housing space toward the second carrier portion and allows the planetary gear to fit into the gear housing space, and
a first support hole that supports the first end portion, the first support hole being provided opening toward the gear housing space on an opposite side to a side where the opening is located with respect to the gear housing space; the second carrier portion includes
a cover portion that covers the opening,
a second support hole that supports the second end portion, the second support hole being provided opening toward the gear housing space in the cover portion, and
a joining portion that joins the second carrier portion to the first carrier portion; and
the joining portion is configured such that the second carrier portion is detachably joined to the first carrier portion and the second carrier portion is joined to the first carrier portion by tightening in a direction aligned with a direction of the axial core of the sun gear,
the planetary gear device further comprising:
a second sun gear with an axial core coaxially located with the axial core of the sun gear;
a second planetary gear that meshes with the second sun gear;
a second internal gear that meshes with the second planetary gear;
a transmission gear that meshes with the planetary gear and transmits rotation of the planetary gear to the second planetary gear,
wherein the carrier includes a second planetary support shaft that supports the second planetary gear;
the first carrier portion includes
a second gear housing space that houses the second planetary gear,
a second opening that opens the second gear housing space toward the second carrier portion and allows the second planetary gear to fit into the second gear housing space, and
a second support shaft first support hole that supports a second support shaft first end portion of the second planetary support shaft located on a second planetary support shaft first end side of the second planetary gear, the second support shaft first support hole being provided opening toward the second gear housing space on an opposite side to a side where the second opening is located with respect to the second gear housing space; and
the second carrier portion includes
a second cover portion that covers the second opening, and a second support shaft second support hole that supports a second support shaft second end portion of the second planetary support shaft located on a second planetary support shaft second end side of the second planetary gear, the second support shaft second support hole being provided opening toward the second gear housing space in the second cover portion.

2. The planetary gear device according to claim 1, wherein
the planetary gear is provided at a plurality of sections around the sun gear;
the first carrier portion is made by casting; and
an outer circumferential portion of the first carrier portion is formed by turning.

3. The planetary gear device according to claim 1, wherein
the transmission gear is configured to be housed in the second gear housing space while being supported by the second planetary support shaft; and
the second support shaft second end portion is located on the second planetary support shaft on a second planetary support shaft second end side of the transmission gear.

4. The planetary gear device according to claim 1, wherein
the planetary gear is provided at a plurality of sections around the sun gear;
the second planetary gear is provided numbering the same as the planetary gears;
the first carrier portion is made by casting; and
an outer circumferential portion of the first carrier portion is formed by turning.

5. A planetary gear device, comprising:
a sun gear;
a planetary gear that meshes with the sun gear;
an internal gear that meshes with the planetary gear; and
a carrier that rotatably supports the planetary gear and rotates together with the planetary gear revolving around the sun gear with an axial core of the sun gear as its center of rotation,
wherein the carrier includes
a planetary support shaft that supports the planetary gear,
a first carrier portion that supports a first end portion of the planetary support shaft located on a planetary support shaft first end side of the planetary gear, and
a second carrier portion that supports a second end portion of the planetary support shaft located on a planetary support shaft second end side of the planetary gear;
the first carrier portion includes
a gear housing space that houses the planetary gear,
an opening that opens the gear housing space toward the second carrier portion and allows the planetary gear to fit into the gear housing space, and
a first support hole that supports the first end portion, the first support hole being provided opening toward the gear housing space on an opposite side to a side where the opening is located with respect to the gear housing space;
the second carrier portion includes
a cover portion that covers the opening, a second support hole that supports the second end portion, the second support hole being provided opening toward the gear housing space in the cover portion,
a joining portion that joins the second carrier portion to the first carrier portion;
the joining portion is configured such that the second carrier portion is detachably joined to the first carrier portion and the second carrier portion is joined to the first carrier portion by tightening in a direction aligned with a direction of the axial core of the sun gear, the planetary gear device further comprising
a joining bolt including an axial core in a direction aligned with the direction of the axial core of the sun gear, the joining bolt being configured to tighten and join the joining portion to the first carrier portion by being installed in the joining portion and the first carrier portion and tightened.

6. A planetary gear device, comprising:
a sun gear;
a planetary gear that meshes with the sun gear;
an internal gear that meshes with the planetary gear;
a carrier that rotatably supports the planetary gear and rotates together with the planetary gear revolving around the sun gear with an axial core of the sun gear as its center of rotation;
a sun oil supply passage formed at an outer circumferential portion of a sun support shaft that rotatably supports the sun gear, the sun oil supply passage being configured to supply lubricating oil between the sun gear and the sun support shaft;
a planetary oil supply passage formed at a planetary support shaft provided on the carrier in a state of rotatably supporting the planetary gear, the planetary oil supply passage being configured to supply lubricating oil between the planetary support shaft and the planetary gear; and
an oil supply passage formed connecting the sun oil supply passage and the planetary oil supply passage and extending in a direction aligned with a radial direction of the carrier and aligned with the carrier, the oil supply passage being configured to take in lubricating oil from the sun oil supply passage and supply the lubricating oil thus taken in to the planetary oil supply passage via rotation of the carrier.

7. The planetary gear device according to claim 6, wherein
the oil supply passage includes an upstream oil passage portion that opens to the sun oil supply passage, a downstream oil passage portion that opens to the planetary oil supply passage, and a connection oil passage portion that connects the upstream oil passage portion and the downstream oil passage portion;
in the oil supply passage, an oil passage width of the downstream oil passage portion in a direction aligned with the direction of the axial core of the sun gear is less than an oil passage width of the upstream oil passage portion in a direction aligned with the direction of the axial core; and
the connection oil passage portion is formed with an oil passage width in a direction aligned with the direction of the axial core that tapers downstream on the downstream oil passage portion side.

8. The planetary gear device according to claim 6, comprising
a second sun gear with an axial core coaxially located with the axial core of the sun gear;
a second planetary gear that meshes with the second sun gear;
a second internal gear that meshes with the second planetary gear;

a transmission gear that meshes with the planetary gear and transmits rotation of the planetary gear to the second planetary gear, wherein the carrier includes a second planetary support shaft that supports the second planetary gear and is configured to rotate together with the second planetary gear revolving around the second sun gear with the axial core of the second sun gear as its center of rotation, the planetary gear device further includes a second planetary oil supply passage formed in the second planetary support shaft, the second planetary oil supply passage being configured to supply oil between the second planetary support shaft and the second planetary gear; and a second oil supply passage formed connecting the sun oil supply passage and the second planetary oil supply passage and extending in a direction aligned with a radial direction of the carrier and aligned with the carrier, the second oil supply passage being configured to take in lubricating oil from the sun oil supply passage and supply the lubricating oil thus taken in to the second planetary oil supply passage via rotation of the carrier.

9. The planetary gear device according to claim 8, wherein the second oil supply passage includes a second upstream oil passage portion that opens to the sun oil supply passage, a second downstream oil passage portion that opens to the second planetary oil supply passage, and a second connection oil passage portion that connects the second upstream oil passage portion and the second downstream oil passage portion;

in the second oil supply passage, an oil passage width of the second downstream oil passage portion in a direction aligned with the direction of the axial core of the sun gear is less than an oil passage width of the second upstream oil passage portion in a direction aligned with the direction of the axial core; and the second connection oil passage portion is formed with an oil passage width in a direction aligned with the direction of the axial core that tapers downstream on the second downstream oil passage portion side.

10. The planetary gear device according to claim 8, wherein the transmission gear is supported by the second planetary support shaft.

11. The planetary gear device according to claim 8, wherein the planetary gear is provided at a plurality of sections around the sun gear;

the second planetary gear is provided numbering the same as the planetary gears;

the planetary oil supply passage is formed in the planetary support shaft of each of the planetary gears; and the second planetary oil supply passage is formed in the second planetary support shaft of the second planetary gears numbering the same as the planetary gears.

12. A compound planetary gear device, comprising:

a first planetary gear device unit including a first sun gear, a first planetary gear that meshes with the first sun gear, and a first internal gear that meshes with the first planetary gear;

a second planetary gear device unit including a second sun gear with an axial core coaxially located with an axial core of the first sun gear, a second planetary gear that meshes with the second sun gear, and a second internal gear that meshes with the second planetary gear; and a carrier that rotatably supports the first planetary gear and the second planetary gear and is configured to rotate together with the first planetary gear revolving around the first sun gear and together with the second planetary gear revolving around the second sun gear with the axial core of the first sun gear as its center of rotation, wherein the carrier includes a first planetary support shaft that supports the first planetary gear, a second planetary support shaft that supports the second planetary gear, a first carrier portion that supports a first end portion of the first planetary support shaft on a first planetary support shaft first end side of the first planetary gear and supports a second support shaft first end portion of the second planetary support shaft on a second planetary support shaft first end side of the second planetary gear, and a second carrier portion that supports a second end portion of the first planetary support shaft on a first planetary support shaft second end side of the first planetary gear and supports a second support shaft second end portion of the second planetary support shaft on a second planetary support shaft second end side of the second planetary gear;

the second carrier portion is configured to be separable from the first carrier portion; and a reinforcing portion is integrally formed on one of the first carrier portion or the second carrier portion, the reinforcing portion being configured to be detachable from the other one of the first carrier portion and the second carrier portion and being configured to join the first carrier portion and the second carrier portion.

13. The compound planetary gear device according to claim 12, further comprising a transmission gear that meshes with the first planetary gear and transmits rotation of the first planetary gear to the second planetary gear, wherein the transmission gear is supported by the second planetary support shaft;

the second support shaft first end portion of the second planetary support shaft is located on the second planetary support shaft on a second planetary support shaft first end side of the transmission gear; and the second support shaft second end portion of the second planetary support shaft is located on the second planetary support shaft on a second planetary support shaft second end side of the transmission gear.

14. The compound planetary gear device according to claim 12, wherein the reinforcing portion is integrally formed with the first carrier portion and configured to be detachable from the second carrier portion.

15. The compound planetary gear device according to claim 12, further comprising screw member including an axial core in a direction aligned with the direction of the axial core of the first sun gear, the screw member being configured to join the second carrier portion to the first carrier portion by being tightened in the second carrier portion and the reinforcing portion.

16. The compound planetary gear device according to claim 12, wherein the first planetary gear is provided at a plurality of sections around the first sun gear;

the second planetary gear is provided numbering the same as the first planetary gears; the first carrier portion is made by casting; and an outer circumferential portion of the first carrier portion is formed by turning.

\* \* \* \* \*